(12) United States Patent
Komiya et al.

(10) Patent No.: US 8,106,978 B2
(45) Date of Patent: Jan. 31, 2012

(54) IMAGE CAPTURING APPARATUS GENERATING IMAGE DATA HAVING INCREASED COLOR REPRODUCIBILITY

(75) Inventors: Yasuhiro Komiya, Hino (JP); Takeyuki Ajito, Hachioji (JP)

(73) Assignee: Olympus Corporation, Tokyo (JP)

( * ) Notice: Subject to any disclaimer, the term of this patent is extended or adjusted under 35 U.S.C. 154(b) by 398 days.

(21) Appl. No.: 12/421,336

(22) Filed: Apr. 9, 2009

(65) Prior Publication Data
US 2009/0256927 A1 Oct. 15, 2009

(30) Foreign Application Priority Data
Apr. 11, 2008 (JP) ................................. 2008-103752

(51) Int. Cl.
*H04N 5/225* (2006.01)
*H04N 9/09* (2006.01)
*H04N 9/97* (2006.01)
(52) U.S. Cl. .................... 348/262; 348/272; 348/343
(58) Field of Classification Search .............. 348/262, 348/272, 273, 342, 343
See application file for complete search history.

(56) References Cited

U.S. PATENT DOCUMENTS

| | | | | |
|---|---|---|---|---|
| 4,876,591 A | * | 10/1989 | Muramatsu | 348/236 |
| 2004/0233295 A1 | * | 11/2004 | Hoshuyama | 348/222.1 |
| 2007/0051876 A1 | * | 3/2007 | Sumi et al. | 250/214 R |
| 2008/0211941 A1 | * | 9/2008 | Deever et al. | 348/262 |

FOREIGN PATENT DOCUMENTS
JP 2003-023643 1/2003

* cited by examiner

*Primary Examiner* — Gevell Selby
(74) *Attorney, Agent, or Firm* — Volpe and Koenig, P.C.

(57) ABSTRACT

An image capturing apparatus includes a first image sensor unit, a second image sensor unit, and a spatial frequency reduction unit. The first image sensor unit is capable of subjecting an object image formed by an imaging lens to a photoelectric conversion to output a first image signal having a first resolution and constituted by a first number of colors. The second image sensor unit is capable of subjecting the object image formed by the imaging lens to a photoelectric conversion to output a second image signal having a second resolution that is lower than the first resolution and constituted by a second number of colors that is larger than the first number of colors. The spatial frequency reduction unit reduces a spatial frequency of the object image formed on a light receiving surface of the second image sensor unit by the imaging lens.

8 Claims, 12 Drawing Sheets

$$M(x,y) = n \times m \times M_{i+1,j+1} + n \times (1-m) \times M_{i,j+1}$$
$$+ (1-n) \times m \times M_{i+1,j} + (1-n) \times (1-m) \times M_{i,j}$$

WHERE $m = \dfrac{x - Cx_i}{Cx_{i+1} - Cx_i}$, $n = \dfrac{y - Cy_j}{Cy_{j+1} - Cy_j}$ $M_{i,j}$ : COLOR CONVERSION MATRIX FOR AREA P ij $(Cx_i, Cy_j)$ : CENTRAL PIXEL POSITION OF AREA P ij

IMAGE CAPTURING APPARATUS GENERATING IMAGE DATA HAVING INCREASED COLOR REPRODUCIBILITY

FIELD OF THE INVENTION

This invention relates to an image capturing apparatus capable of obtaining highly faithful images by gathering spectral information from an object.

BACKGROUND OF THE INVENTION

With the popularization and development of digital cameras, pixel counts have increased. Meanwhile, attempts are being made to find methods enabling more faithful color reproduction. A color management system is available as a method enabling more faithful color reproduction. A color management system is a system with which identical colors can be reproduced between different devices. By employing image data conforming to the sRGB standard, for example, during image data exchange between different devices, color reproduction that is less device-dependent can be realized.

In addition to reductions in device-dependency during color reproduction, attempts are being made to widen the gamut. For example, Adobe RGB and so on are known as standards enabling color reproduction in a wider gamut.

However, when an attempt is made to achieve more faithful color reproduction by further increasing color reproducibility, there is a limit to the color reproduction that can be achieved using three primary colors such as B (blue), G (green) and R (red). Therefore, methods enabling color reproduction in a wider gamut, such as methods for handling images using a larger number of primary colors than three, for example 6, 8, 16, and so on, are being developed.

In this specification, a method employing more than three primary colors will be referred to as a multi primary color method, and likewise a method employing a larger number of bands than three will be referred to as a multiband method.

JP3826174B discloses an image capturing apparatus capable of generating multi primary color image data. In the image capturing apparatus disclosed in JP3826174B, light emanating from an imaging lens is divided into two beams by a half mirror. One of the beams is led to a luminance detection imaging device to obtain the luminance of an object, while the other beam is further divided by a dichroic mirror and then led to a shorter wavelength component imaging device and a longer wavelength component imaging device. Spectral information relating to the object is estimated on the basis of color signals output by the short wavelength component imaging device and the long wavelength component imaging device. The estimated spectral information of the object is then applied to a lightness signal obtained from the luminance detection imaging device, whereby an eight-color multiband image is generated.

Further, "Comparison of spectral image reconstruction methods using multipoint spectral measurements", MURAKAMI Yuri and 3 others, Color Forum JAPAN, 2007 Proceedings, Meeting of Managers of Four Academic Associations Concerning Optics, November 2007, p. 133-136 discloses a method enabling generation of more faithful images, albeit RGB three primary color images, which uses a three band camera employing a BGR three primary color imaging device and a multipoint spectral measurement sensor attached to the three band camera to be capable of measuring a spectrum in a plurality of locations on an object.

In this technique, the spectral sensor scans the object from the upper, lower, left and right such that the spectrum of the object is measured at a plurality of measurement points, i.e. 8×8, 16×16, 32×32, 64×64. A spectral reflectance image is then generated through estimation from three band image data output by the three band camera and the object spectrum measurement result obtained by the multipoint spectral measurement sensor. An XYZ image is then determined as an image simulating the appearance of the colors of the object when the spectral reflectance image is illuminated by illumination light having an arbitrary spectral radiance. A display RGB image is then generated by applying a display characteristic of a display device to the XYZ image.

According to the technique disclosed in the paper written by Murakami et al, an image having a reduced color difference can be obtained by increasing the number of measurement points during spectral measurement using a multipoint spectral measurement sensor.

SUMMARY OF THE INVENTION

In the constitution of JP3826174B, a spectral optical system including a half mirror and a dichroic mirror and three imaging devices, i.e. the luminance detection imaging device, the short wavelength component imaging device, and the long wavelength component imaging device, are required, and therefore the image capturing apparatus is large and expensive. Needless to say, the load required to process signals output from the imaging devices is also large.

In the constitution disclosed in the paper written by Murakami et al, a conventional three band camera can be used, which is advantageous, but on the other hand, two-dimensional scanning must be performed using a spectral sensor capable of spot measurement, and therefore measurement of the spectrum of the object takes time, making continuous image pickup and moving image pickup difficult. Moreover, an optical axis of the image pickup optical system of the three band camera and an optical axis of the spectral sensor do not match, and therefore a parallax occurs. The parallax varies according to the image pickup distance, and it is therefore difficult to align an image pickup area (field of view) of the three band camera and an object measurement position of the spectral sensor in accordance with the image pickup distance.

An object of this invention is to solve the problems described above by providing an image capturing apparatus capable of generating more faithful images with a simplified overall constitution, a reduced size, and superior operability.

According to one aspect of this invention, an image capturing apparatus is provided. The image capturing apparatus comprises: a first image sensor unit capable of subjecting an object image formed by an imaging lens to a photoelectric conversion to output a first image signal having a first resolution and constituted by a first number of colors; a second image sensor unit capable of subjecting the object image formed by the imaging lens to a photoelectric conversion to output a second image signal having a second resolution that is lower than the first resolution and constituted by a second number of colors that is larger than the first number of colors; and a spatial frequency reduction unit for reducing a spatial frequency of the object image formed on a light receiving surface of the second image sensor unit by the imaging lens.

According to another aspect of this invention, an image capturing apparatus is provided. The image capturing apparatus comprises: a first image sensor unit capable of subjecting an object image formed by an imaging lens to a photoelectric conversion to output a first image signal having a first resolution and constituted by a first number of colors; a second image sensor unit capable of subjecting the object image formed by the imaging lens to a photoelectric conversion to output a second image signal having a second resolution that is lower than the first resolution and constituted by a second number of colors that is larger than the first number of colors; a reflection mirror capable of moving between an observation position and an image pickup position, whereby in the observation position, an object light emanating from the imaging lens is led onto a focusing screen disposed in a conjugated position with a light receiving surface of the first image sensor unit to make the object image observable, and in the image pickup position, the reflection mirror retreats from an optical path of the object light such that the object image formed by the imaging lens is led to the first image sensor unit; a re-imaging optical system for reforming a primary image of the object formed on the focusing screen when the reflection mirror is in the observation position such that a secondary image is formed on a light receiving surface of the second image sensor unit; and a spatial frequency reduction unit for reducing a spatial frequency of the secondary image formed on the light receiving surface of the second image sensor unit by the re-imaging optical system.

Embodiments and advantages of this invention will be described in detail below with reference to the attached drawings.

BRIEF DESCRIPTION OF THE DRAWINGS

FIG. 12A is a view illustrating an example of the arrangement of the on-chip color filters provided on the image sensor used in the image capturing apparatus according to the third embodiment, showing an example of an on-chip color filter arrangement in a part not provided with a spectral measurement pixel.

FIG. 12B is a view illustrating an example of the arrangement of the on-chip color filters provided on the image sensor used in the image capturing apparatus according to the third embodiment, showing an example in which orange, cyan and green filters are used as on-chip color filters for the spectral measurement pixel.

FIG. 12C is a view illustrating an example of the arrangement of the on-chip color filters provided on the image sensor used in the image capturing apparatus according to the third embodiment, showing an example in which red, blue, orange, and cyan filters are used as on-chip color filters for the spectral measurement pixel.

FIG. 12D is a view illustrating an example of the arrangement of the on-chip color filters provided on the image sensor used in the image capturing apparatus according to the third embodiment, showing an example in which orange, yellow, purple, and cyan filters are used as on-chip color filters for the spectral measurement pixel.

FIG. 12E is a view illustrating an example of the arrangement of the on-chip color filters provided on the image sensor used in the image capturing apparatus according to the third embodiment, showing an example of an on-chip color filter arrangement provided on the spectral measurement pixel and image pickup pixels positioned so as to surround the spectral measurement pixel.

DESCRIPTION OF THE PREFERRED EMBODIMENTS

First Embodiment

Figure 1:
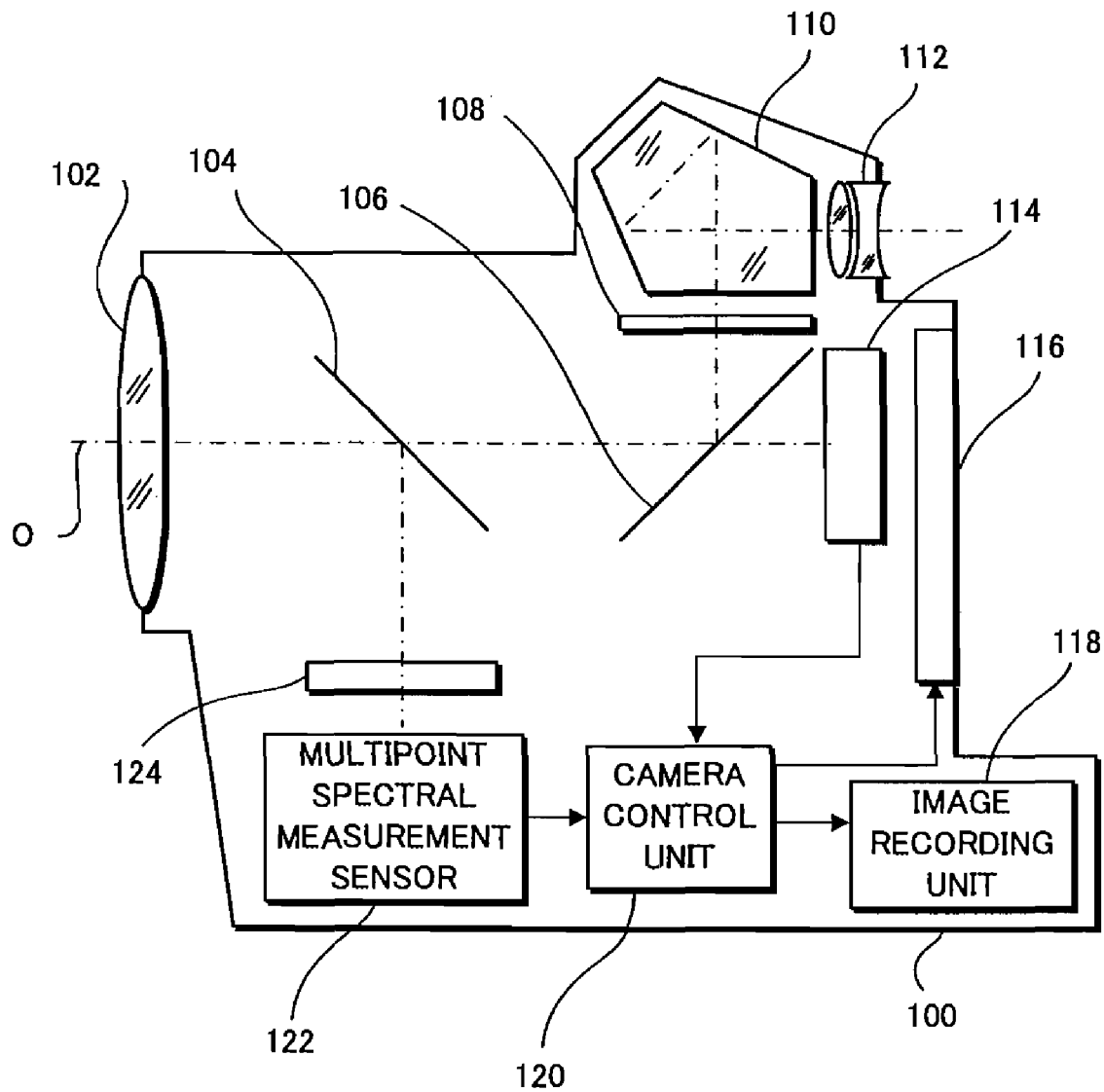
FIG. 1 is a block diagram illustrating an example of the internal constitution of an image capturing apparatus according to a first embodiment.

FIG. 1 is a block diagram showing the schematic constitution of an image capturing apparatus 100 according to a first embodiment of this invention. It is assumed in the following description that the image capturing apparatus 100 is a single-lens reflex type digital still camera formed such that an imaging lens can be replaced, but the imaging lens may be fixed. Furthermore, the image capturing apparatus 100 need not be a reflex type camera.

The image capturing apparatus 100 comprises an imaging lens 102, a half mirror 104, a main mirror 106, a focusing screen 108, a pentagonal roof prism 110 (in this specification, the pentagonal roof prism will be referred to hereafter as a "pentaprism"), an eyepiece 112, an RGB image sensor 114, a display unit 116, an image recording unit 118, a camera control unit 120, a multipoint spectral measurement sensor 122, and an optical low-pass filter 124 (in this specification, the optical low-pass filter will be referred to hereafter as an "OLPF").

The imaging lens 102 can be exchanged with various types of lens according to the photography aim. The half mirror 104 is disposed in a position that intersects an optical path of an object light emanating from the imaging lens 102, and leads a part of the object light to the multipoint spectral measurement sensor 122 and the remainder of the object light to the main mirror 106.

The main mirror 106 is a well-known mirror for a single-lens reflex camera, which is capable of swinging between an observation position and an image pickup position. In the observation position, as shown in FIG. 1, the main mirror 106 is positioned in a position that intersects the optical path of the object light emanating from the imaging lens 102 (in this specification, this position will be referred to as a "down position") so as to reflect the object light and thereby lead it to the focusing screen 108.

In the image pickup position, the main mirror 106 swings upward so as to retreat from the optical path of the object light (in this specification, this position will be referred to as an "up position"), whereby the object light emanating from the imaging lens 102 is led to a light receiving surface of the RGB image sensor 114. An OLPF for suppressing moiré, which occurs when an object having a cyclic pattern is photographed, a focal plane shutter that defines an exposure time of the RGB image sensor 114, and so on are disposed between the RGB image sensor 114 and the imaging lens 102, but description and illustration of the OLPF, focal plane shutter, and so on have been omitted.

The focusing screen 108 is disposed in a conjugated position with the light receiving surface of the RGB image sensor 114 such that when the main mirror 106 is in the down position, an object image (primary image) is formed on the focusing screen 108. Thus, a photographer can observe an enlarged object image converted into an upright and laterally correct image via the pentaprism 110 and the eyepiece 112.

The RGB image sensor 114 subjects the object image formed by the imaging lens 102 to photoelectric conversion and outputs an image signal. It should be noted that in this specification, the RGB image sensor 114 is assumed to be constituted by a C-MOS image sensor capable of outputting a digital image signal (RGB Bayer data), which comprises an array of photoelectric conversion elements disposed two-dimensionally, and a circuit block for performing processing such as CDS (correlated double sampling), AGC (automatic gain control), and A/D conversion on an analog signal output by the photoelectric conversion element array and outputting a digital image signal.

Further, it is assumed in the following description that the RGB image sensor 114 is a single plate sensor in which on-chip color filters in one of blue (B), green (G) and red (R) are provided on the photoelectric conversion element array in a so-called Bayer arrangement. In an embodiment of this invention, the RGB image sensor 114 has a twelve megapixel resolution in which 4000 pixels are arranged in a horizontal direction and 3000 pixels are arranged in a vertical direction.

Furthermore, it is assumed in the following description that the multipoint spectral measurement sensor 122 is constituted by a C-MOS image sensor capable of outputting a digital image signal, which comprises an array of photoelectric conversion elements disposed two-dimensionally, and a circuit block for performing processing such as CDS (correlated double sampling), AGC (automatic gain control), and A/D conversion on an analog signal output by the photoelectric conversion element array and outputting a digital image signal.

The multipoint spectral measurement sensor 122 is constituted to be capable of outputting an image signal having a larger number of colors than the number of colors of the image signal that can be output by the RGB image sensor 114.

The multipoint spectral measurement sensor 122 may also be constituted by a single plate imaging device including on-chip color filters.

In this embodiment, the number of colors of the on-chip color filters provided in the multipoint spectral measurement sensor 122 is six, comprising cyan (C), yellow (Y) and orange (O) in addition to B, G, R. In other words, a single spectral sensor subset is formed by six pixels.

Further, the multipoint spectral measurement sensor 122 of this embodiment has a 7200 pixel resolution in which 240 pixels are arranged in the horizontal direction and 30 pixels are arranged in the vertical direction. The pixel arrangement and on-chip color filter arrangement of the RGB image sensor 114 and the multipoint spectral measurement sensor 122 will be described in detail below with reference to FIGS. 3 to 5.

The OLPF 124 is used to reduce a spatial frequency of the object image formed on the light receiving surface of the multipoint spectral measurement sensor 122. Instead of the OLPF 124, a transparent or translucent substrate exhibiting a light dispersing action may be used. Alternatively, the spatial frequency of the object image may be reduced through defocusing performed by offsetting the light receiving surface of the multipoint spectral measurement sensor 122 from a focal plane of the imaging lens 102 in the optical path direction of the object light (or an optical axis direction). In so doing, the OLPF 124 can be omitted.

The display unit 116 comprises a TFT color liquid crystal panel, an organic EL display panel, or the like, and is constituted to be capable of displaying an image based on the image data generated by the image capturing apparatus 100. The image recording unit 118 may be constituted by an inbuilt flash memory, a memory card attached to the image capturing apparatus 100 detachably, and so on.

The camera control unit 120 is used to perform overall control of operations such as an image pickup operation of the image capturing apparatus 100, post-image pickup image processing and recording, and reproduction of a recorded image, and is constituted by a CPU, an ASIC (application specific integrated circuit), a RAM, a ROM, and so on. During an image pickup operation, the camera control unit 120 generates image data constituted by three color RGB color planes by performing demosaicing processing on the image signal output by the RGB image sensor 114. Further, on the basis of multipoint spectral data output by the multipoint spectral measurement sensor 122, the camera control unit 120 performs color conversion processing on the RGB image data, and then displays an image on the display unit 116 and records the image in the image recording unit 118.

Figure 2:
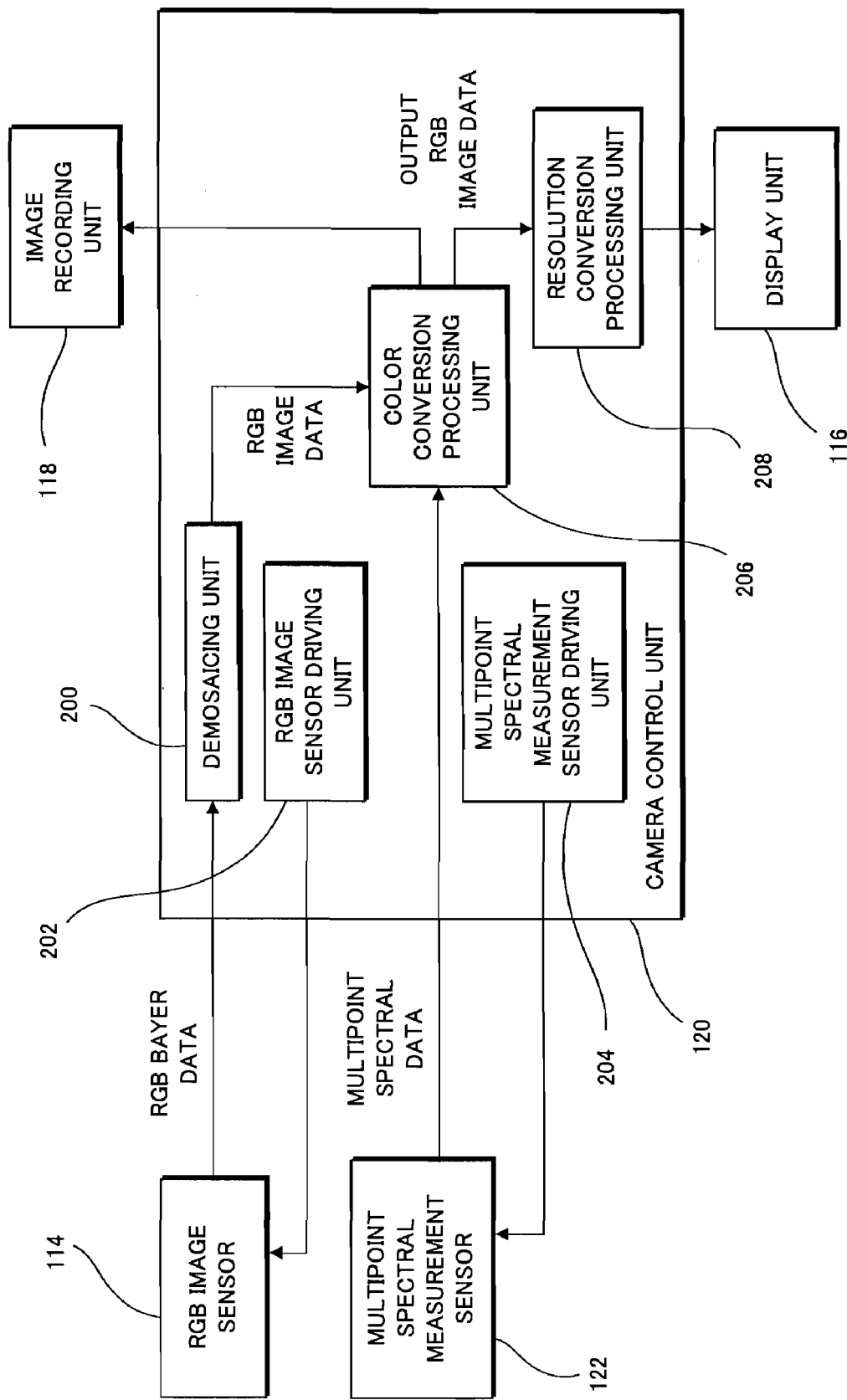
FIG. 2 is a block diagram illustrating an example of the internal constitution of a camera control unit.

FIG. 2 is a block diagram illustrating the internal constitution of the camera control unit 120. The camera control unit 120 comprises a demosaicing unit 200, an RGB image sensor driving unit 202, a multipoint spectral measurement sensor driving unit 204, a color conversion processing unit 206, and a resolution conversion processing unit 208. The demosaicing unit 200 implements demosaicing processing on the image data (RGB Bayer data) output by the RGB image sensor 114 to generate image data constituted by three color RGB color planes.

The RGB image sensor driving unit 202 outputs a control signal to the RGB image sensor 114 to control the image pickup (photoelectric conversion) and image data output operations of the RGB image sensor 114. The multipoint spectral measurement sensor driving unit 204 outputs a control signal to the multipoint spectral measurement sensor 122 to control the spectral measurement and spectral data output operations of the multipoint spectral measurement sensor 122.

The demosaicing unit 200 performs demosaicing processing on the RGB Bayer data output by the RGB image sensor 114 to generate 12-million pixel RGB image data constituted by three color RGB color planes.

The color conversion processing unit 206 performs color conversion processing, to be described in detail below, on the RGB image data output by the demosaicing unit 200 on the basis of the multipoint spectral data output by the multipoint spectral measurement sensor 122. Generated output RGB image data processed by the color conversion processing unit 206 are output to the image recording unit 118 and the resolution conversion processing unit 208. The image recording unit 118 records the output RGB data. The resolution conversion processing unit 208 converts the resolution of the output RGB image data to a resolution suited to a display resolution of the display unit 116.

An example in which the output RGB image data generated by the color conversion processing unit 206 are recorded in the image recording unit 118 was described above, but so-called RAW data may be recorded in the image recording unit 118. In this case, the color conversion processing unit 206 may output the RAW data without the color conversion processing and a color conversion processing parameter may be output to the image recording unit 118 for recording therein.

Figure 3:
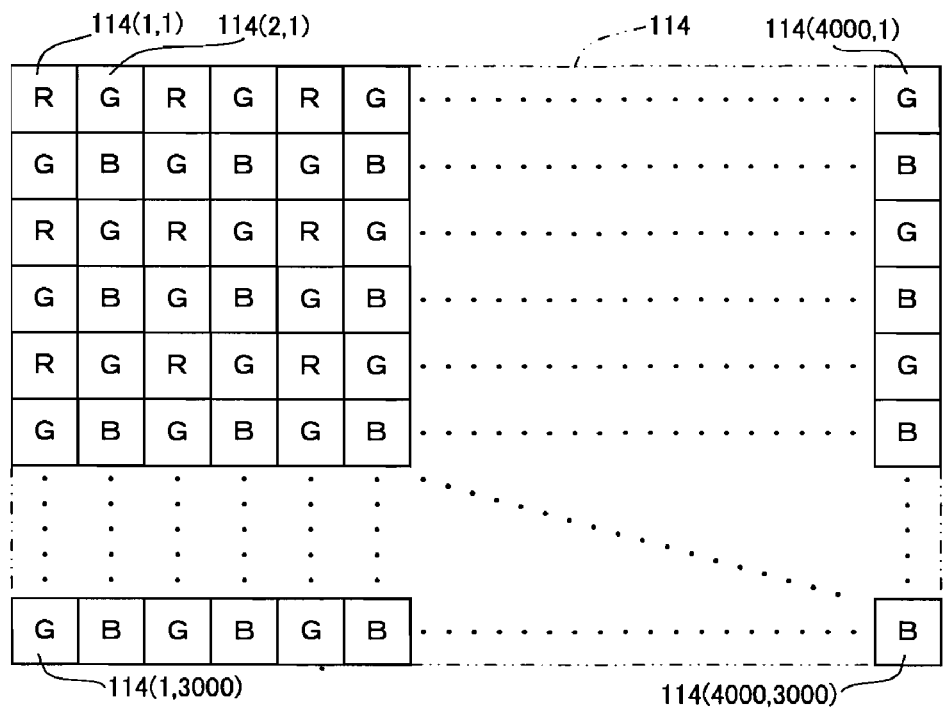
FIG. 3 is a view illustrating a pixel arrangement of an RGB image sensor.

FIG. 3 is a schematic diagram illustrating the pixel arrangement of the RGB image sensor 114. As described above, the RGB image sensor 114 has a Bayer arrangement of on-chip color filters constituted by 4000 horizontal pixels and 3000 vertical pixels. In FIG. 3, a reference numeral 114 (1, 1) is attached to an upper left corner pixel and a reference numeral 114 (4000, 3000) is attached to a lower right corner pixel.

Figure 4:
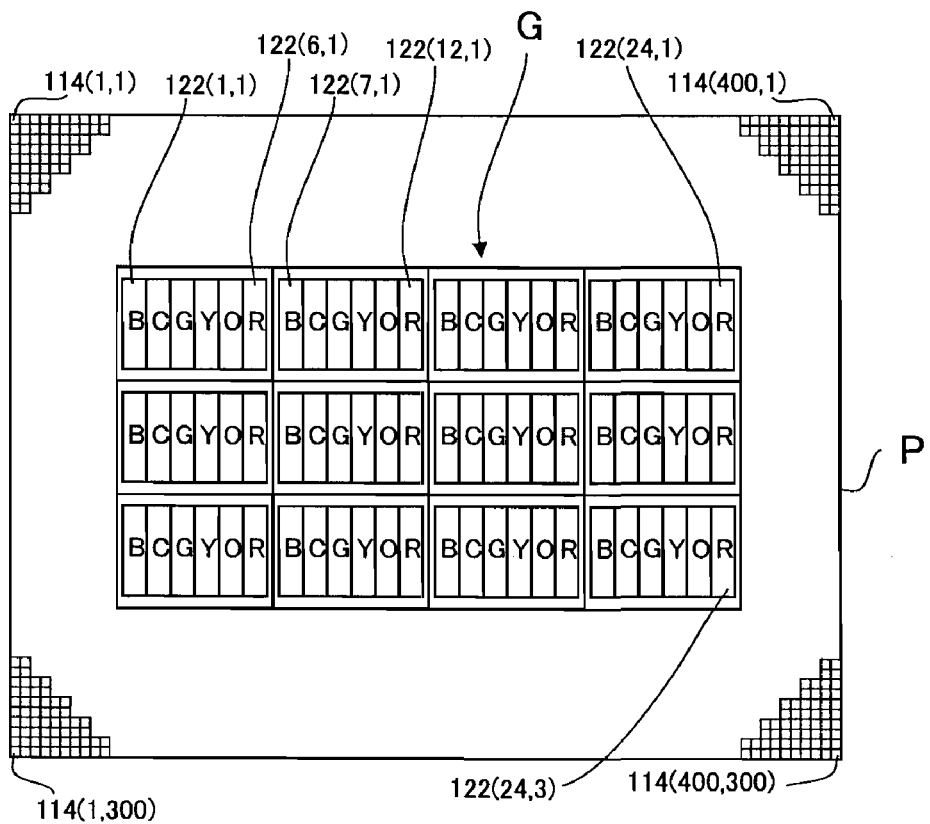
FIG. 4 is a schematic diagram showing the manner in which a multipoint spectral measurement sensor is provided in relation to a divided area defined within the RGB image sensor.

FIG. 4 is a schematic diagram illustrating an example of a relationship between the pixel arrangement of the RGB image sensor 114 and the pixel arrangement of the multipoint spectral measurement sensor 122. In the example shown in FIG. 4, pixels 122 (1, 1) . . . 122 (24, 3) of the multipoint spectral measurement sensor 122 are arranged in 24 rows in the horizontal direction of FIG. 4 and 3 columns in the vertical direction in relation to a single divided area P of the pixels of the RGB image sensor 114, the divided area P being formed from 400 pixels in the horizontal direction in FIG. 4 and 300 pixels in the vertical direction. In FIG. 4, the reference numeral 122 (1, 1) is attached to an upper left corner pixel of the multipoint spectral measurement sensor 122 and the reference numeral 122 (24, 3) is attached to a lower right corner pixel.

Each of the pixels constituting the multipoint spectral measurement sensor 122 is provided with an on-chip color filter in one of blue (B), cyan (C), green (G), yellow (Y), orange (O), and red (R). In the example shown in FIG. 4, a single spectral measurement unit is formed from six pixels from the pixel 122 (1, 1) to a pixel 122 (6, 1), and a single spectral sensor subset G is formed by arranging four spectral measurement units in the horizontal direction of FIG. 4 and three spectral measurement units in the vertical direction.

In other words, the spectral sensor subset G, which is constituted by a total of twelve spectral measurement units comprising four spectral measurement units in the horizontal direction and three spectral measurement units in the vertical direction, is provided on the single divided area P, which is constituted by a total of 120,000 pixels comprising 400 pixels in the horizontal direction and 300 pixels in the vertical direction. As described above, in the RGB image sensor 114 of this embodiment, 4000 pixels are arranged in the horizontal direction and 3000 pixels are arranged in the vertical direction, and therefore the number of divided areas P defined on the RGB image sensor 114 is 4000/400=10 in the horizontal direction, 3000/300=10 in the vertical direction, i.e. a total of 100. This is shown in FIG. 5.

Figure 5:
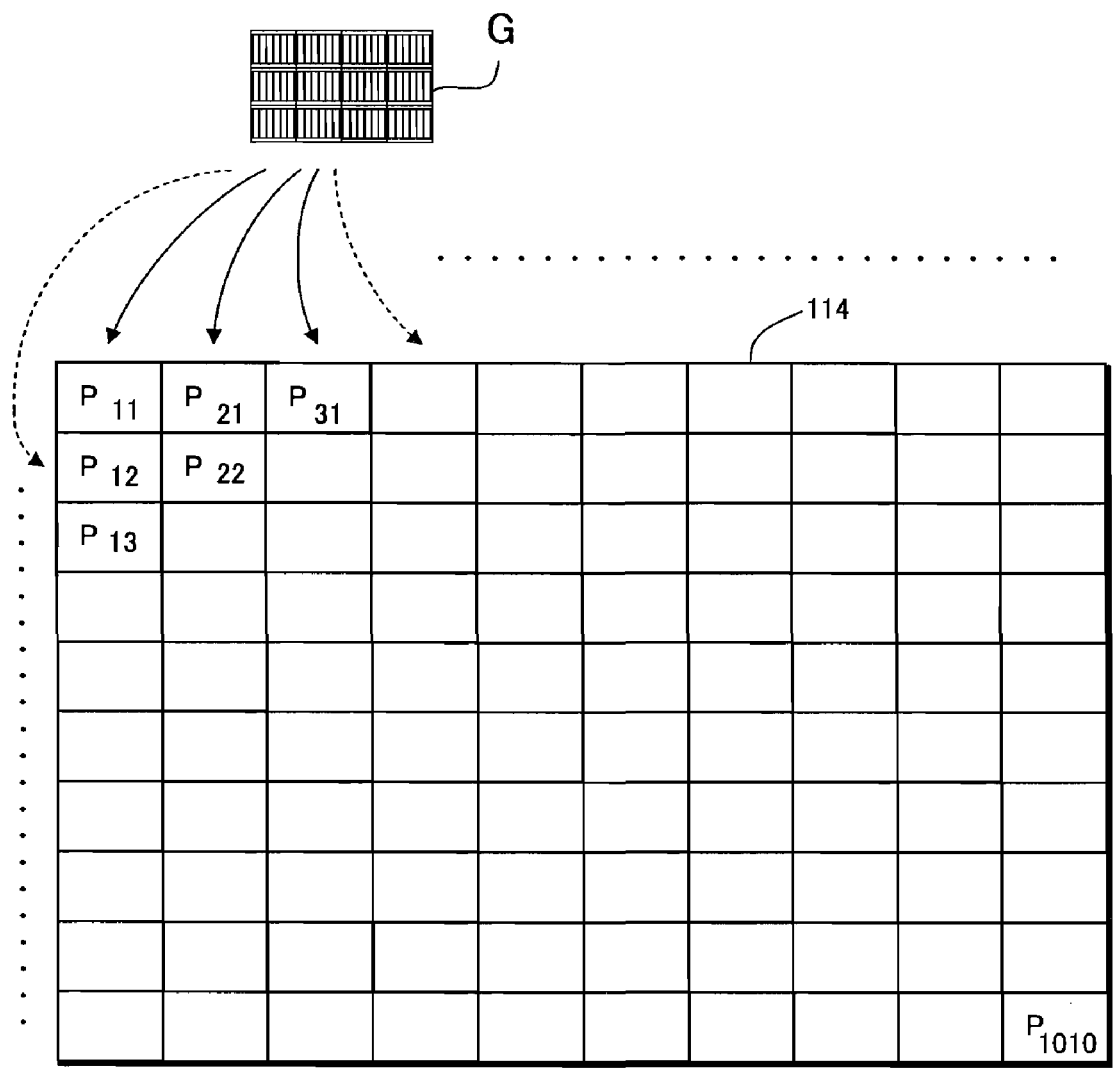
FIG. 5 is a schematic diagram showing the manner in which a plurality of divided areas are defined within the RGB image sensor and a spectral sensor subset is provided in relation to each of the plurality of divided areas.

FIG. 5 shows an outline of the manner in which the 100 divided areas are defined on the RGB image sensor 114. The spectral sensor subset G is provided in relation to each of divided areas $P_{11}, P_{21}, \ldots, P_{1010}$.

The OLPF 124 (FIG. 1) preferably has a fixed characteristic for reducing the spatial frequency of the object image formed by the imaging lens 102 on the light receiving surface of the multipoint spectral measurement sensor 122. More specifically, the OLPF 124 is preferably constituted to reduce the spatial frequency of the object image such that the object light that enters a single spectral measurement unit constituted by six pixels and on-chip color filters in six colors intermingles to form uniform luminous flux. In so doing, a more accurate spectral measurement result excluding the effects of so-called pseudo color can be obtained by a single spectral measurement unit.

To summarize the above, the spectral sensor subset G constituted by twelve spectral measurement units is provided in relation to each of the 100 divided areas $P_{11}, P_{21}, \ldots, P_{1010}$ defined by dividing the light receiving area of the RGB image sensor 114 into 10 parts in the horizontal direction and 10 parts in the vertical direction. The respective spectral sensor subsets G perform spectral measurement in twelve locations of the corresponding divided area ($P_{11}, P_{21}, \ldots, P_{1010}$). In other words, object spectral characteristics of a plurality of (100 in this embodiment) divided areas obtained by dividing the image pickup area of the RGB image sensor 114 two-dimensionally can be measured individually. Moreover, spectral measurement can be performed in twelve locations of the divided area, and therefore the object spectral characteristic can be measured with a higher degree of precision.

A supplementary description of the imaging field of view described above will now be provided. In this specification, the imaging field of view is a rectangular range extending in the up-down and left-right directions, which is defined by reverse projecting the image area of the RGB image sensor 114 toward the object side through the imaging lens 102.

In FIG. 4, the spectral sensor subsets G are depicted as being superimposed onto the divided area P of the RGB image sensor 114. However, the relationship between the size of the pixels constituting the RGB image sensor 114 and the size of the pixels constituting the multipoint spectral measurement sensor 122 does not necessarily have to correspond to that shown in FIG. 4. Further, the shape of the pixels may be set as desired. Moreover, the number of spectral measurement units constituting the spectral sensor subset G is not limited to twelve, and this number may be set as desired. Furthermore, the spectral measurement units may be arranged in close contact, as shown in FIG. 4, or the individual spectral measurement units constituting the spectral sensor subset G may be disposed separately.

The important thing is that the object spectral characteristics of each of the plurality of divided areas obtained by dividing the imaging field of view of the RGB image sensor 114 two-dimensionally can be measured individually. For example, when a re-imaging optical system or the like is disposed between the half mirror 104 and the multipoint spectral measurement sensor 122 in FIG. 1, the size, pitch, and so on of the pixels constituting the multipoint spectral measurement sensor 122 may be varied in accordance with a re-imaging magnification ratio of the re-imaging optical system.

The disposal position of the multipoint spectral measurement sensor 122 is not limited to the example shown in FIG.

1, and a half mirror, a beam splitter, or an optical path splitting optical member employing a movable mirror or the like may be used so that the multipoint spectral measurement sensor 122 can be disposed in any desired position within the image capturing apparatus 100, such as behind or below the main mirror 106, in the vicinity of the focusing screen 108 or pentaprism 110, and so on.

The number of divided areas defined by dividing the light receiving area of the RGB image sensor 114 in the horizontal and vertical directions may be set at an arbitrary number corresponding to the specifications of the image capturing apparatus 100 and so on.

Figure 6:
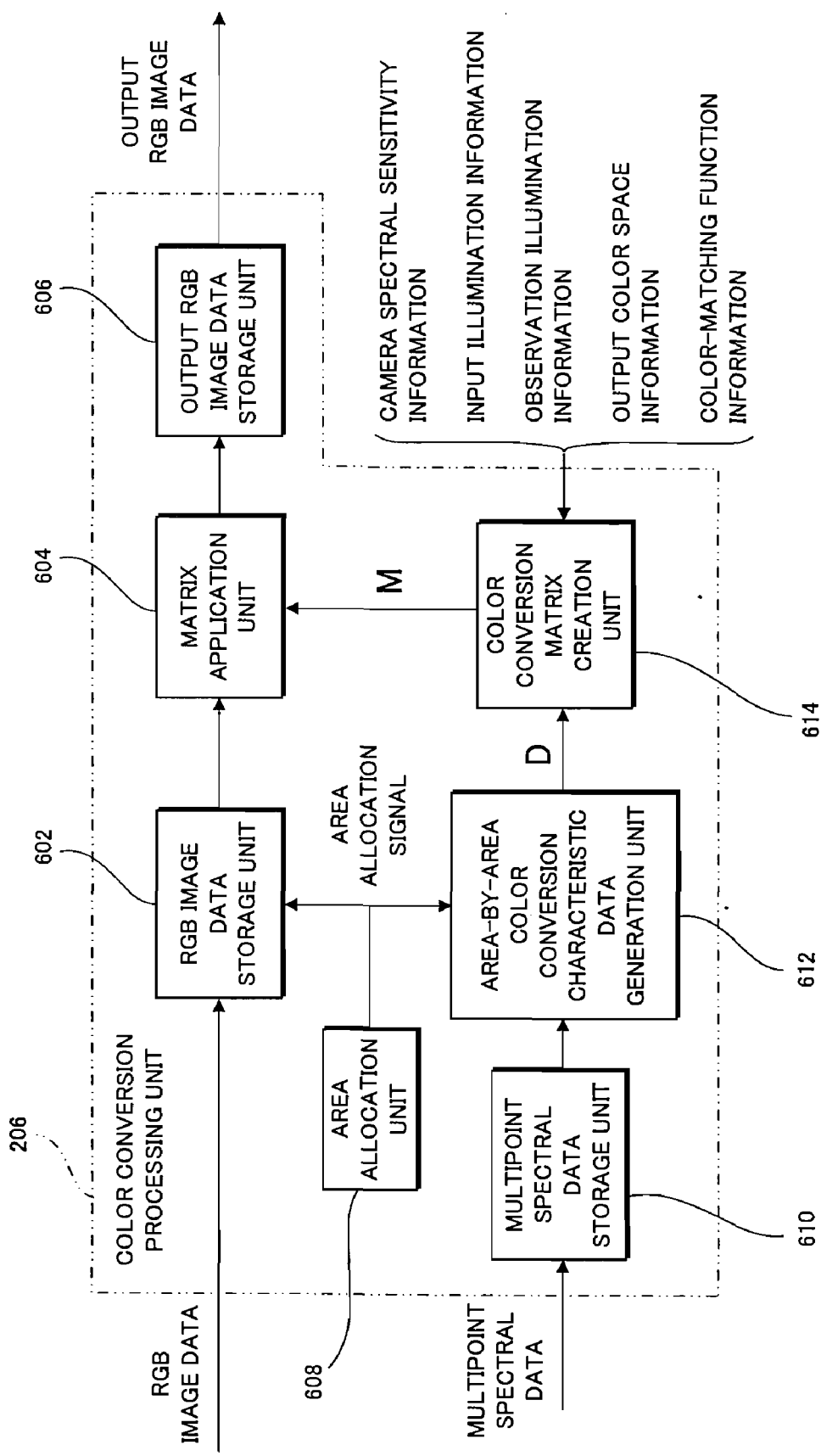
FIG. 6 is a block diagram illustrating an example of the internal constitution of a color conversion processing unit.

FIG. 6 is a schematic block diagram showing an example of the internal constitution of the color conversion processing unit 206. The color conversion processing unit 206 comprises an RGB image data storage unit 602, a matrix application unit 604, an output RGB image data storage unit 606, an area allocation unit 608, a multipoint spectral data storage unit 610, an area-by-area color conversion characteristic data generation unit 612, and a color conversion matrix creation unit 614.

The RGB image data storage unit 602 is constituted by an SDRAM or the like that temporarily stores the RGB image data output by the demosaicing unit 200 (FIG. 2). The multipoint spectral data storage unit 610 is constituted by an SDRAM or the like that temporarily stores the multipoint spectral data output by the multipoint spectral measurement sensor 122 (FIG. 2).

The area allocation unit 608 successively outputs an area allocation signal, which is a signal specifying the divided area $P_{11}, P_{21}, \ldots, P_{1010}$ described with reference to FIG. 5, to the RGB image data storage unit 602 and the area-by-area color conversion characteristic data generation unit 612. For example, the area allocation unit 608 outputs a signal specifying $P_{11}$ first, then outputs a signal specifying $P_{21}$, and so on, and finally outputs a signal specifying $P_{1010}$.

The RGB image data storage unit 602 outputs the RGB image data of the divided area P specified by the area allocation signal, from among the temporarily stored RGB image data, to the matrix application unit 604. The area-by-area color conversion characteristic data generation unit 612 determines color conversion characteristic data D from the multipoint spectral data corresponding to the divided area specified by the area allocation signal and outputs the determined color conversion characteristic data D to the color conversion matrix creation unit 614. The color conversion characteristic data D are constituted by information that is unique to the object, for example, and reflect the colors of the object in the corresponding divided area P. The colors of the object are influenced by the spectral reflectance of the object and the spectral characteristic of the illumination light illuminating the object at the time of image pickup.

The color conversion matrix creation unit 614 determines a color conversion matrix M to be applied to the RGB image data of the divided area specified by the area allocation unit 608 on the basis of the color conversion characteristic data D output by the area-by-area color conversion characteristic data generation unit 612 as well as camera spectral sensitivity information, input illumination information, observation illumination information, output color space information, color-matching function information, and so on, which are input into the color conversion processing unit 206, and outputs the determined color conversion matrix M to the matrix application unit 604.

The camera spectral sensitivity information is determined on the basis of a spectral transmittance of the imaging lens 102 (when a filter is mounted on the imaging lens 102, a spectral transmittance including the characteristic of the filter), a spectral transmittance of the half mirror 104, a spectral sensitivity characteristic of the RGB image sensor 114, and so on.

The input illumination information is information relating to the spectral characteristic of the light illuminating the object at the time of image pickup. The output color space information is determined on the basis of a color reproduction characteristic of a monitor displaying the image and a spectral characteristic of the illumination light illuminating the environment in which the monitor is disposed.

The color-matching function information is information relating to the spectral sensitivity of a standard observer. Further, in this embodiment, the color conversion matrix M may be set as a 3×3 matrix, for example.

The matrix application unit 604 generates the output RGB image data by multiplying the matrix M output by the color conversion matrix creation unit 614 in accordance with the divided area P specified by the area allocation signal by the RGB image data of the divided area P. The output RGB image data are output to and temporarily stored in the output RGB image data storage unit 606, which is constituted by an SDRAM or the like, from the matrix application unit 604.

The area allocation signal specifying the divided area $P_{11}, P_{21}, \ldots, P_{1010}$ is output successively to the RGB image data storage unit 602 and the area-by-area color conversion characteristic data generation unit 612 from the area allocation unit 608. In response, the output RGB image data of the divided area P corresponding to the area allocation signal are temporarily stored in the output RGB image data storage unit 606. Eventually, the output RGB image data of a single frame are stored temporarily in the output RGB image data storage unit.

The output RGB image data storage unit 606 outputs the output RGB image data of a single frame obtained in the manner described above to the image recording unit 118 and the resolution conversion processing unit 208 (FIG. 2).

In this embodiment, as described above, the RGB image sensor 114 is constituted to be capable of outputting a three color RGB image signal having a twelve megapixel resolution, while the multipoint spectral measurement sensor 122 is constituted to be capable of outputting a six color BCGYOR image signal having a 7200 pixel resolution. The object spectral characteristic of each of the plurality of divided areas obtained by dividing the imaging field of view of the RGB image sensor 114 two-dimensionally is measured using the multipoint spectral measurement sensor 122, which is capable of outputting an image signal having a lower resolution than the RGB image sensor 114 but a larger number of colors than the RGB image sensor 114.

A color conversion matrix M corresponding to each divided area is determined using the spectral information of the object obtained in each of the divided areas, and by applying the color conversion matrix M to the RGB image data of each divided area, an improvement in color reproducibility can be achieved. In other words, by using the multipoint spectral measurement sensor 122 described above, an image having higher color reproducibility and a comparatively high resolution can be obtained using the conventional RGB image sensor 114. As a result, the image capturing apparatus 100 can be constructed at a comparatively low cost without increasing its size.

In addition, according to the image capturing apparatus 100 constituted as described with reference to FIG. 1, a user can obtain multipoint spectral information relating to an object in the imaging field of view easily without performing any special operations even when the imaging lens 102 is exchanged or the imaging lens 102 is a so-called zoom lens and a set focal length thereof is varied.

In the above example, a single color conversion matrix M determined in accordance with a single divided area is applied uniformly to the RGB image data (120,000 pixel RGB image data in the example shown in FIG. 4) of the divided area. In this case, an imperfection may occur if a color changes dramatically on a boundary between an image in one divided area and an image in an adjacent divided area. More specifically, when an image based on the output RGB image data of a single frame formed by gathering together the image data corresponding to the individual divided areas P is displayed, block boundaries may stand out, making the image unsightly.

To suppress this imperfection, a constitution to be described below with reference to FIGS. 7 and 8 may be employed. FIG. 8 shows the internal constitution of a color conversion matrix creation unit 614A. This color conversion matrix creation unit 614A is used in place of the color conversion matrix creation unit 614 of the color conversion processing unit 206 shown in FIG. 6.

The color conversion matrix creation unit 614A comprises a representative matrix generation unit 802, a representative matrix storage unit 806, and a matrix interpolation calculation unit 804. The representative matrix generation unit 802 determines a color conversion matrix (representative matrix) in accordance with each of the divided areas P shown in FIG. 5, and outputs the determined representative matrices to the representative matrix storage unit 806. The representative matrix storage unit 806 stores the representative matrices corresponding to the respective divided areas P.

The matrix interpolation calculation unit 804 determines the color conversion matrix to be applied to the RGB image data of the divided area to be subjected to color conversion processing in accordance with a pixel position by performing an interpolation calculation, and outputs the determined color conversion matrix to the matrix application unit 604.

Figure 7:
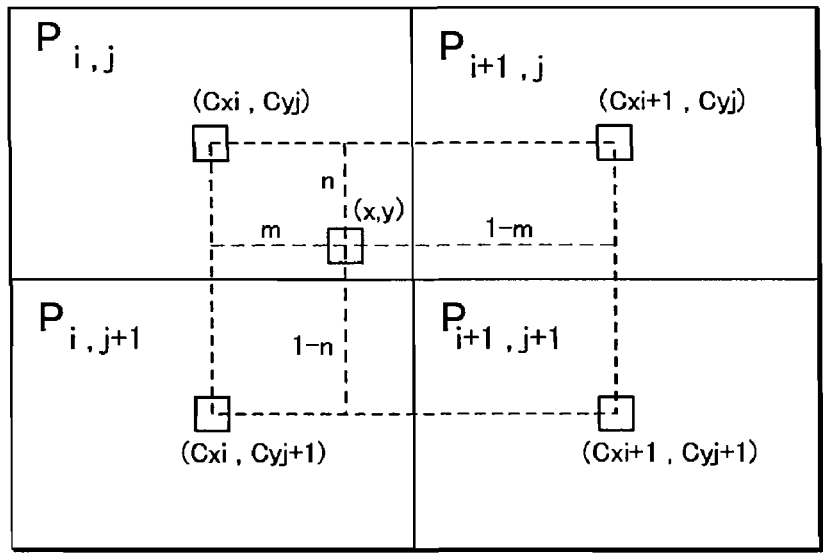
FIG. 7 is a view illustrating a method of varying a color conversion matrix applied to RGB image data in accordance with a pixel position of the RGB image data.
Figure 8:
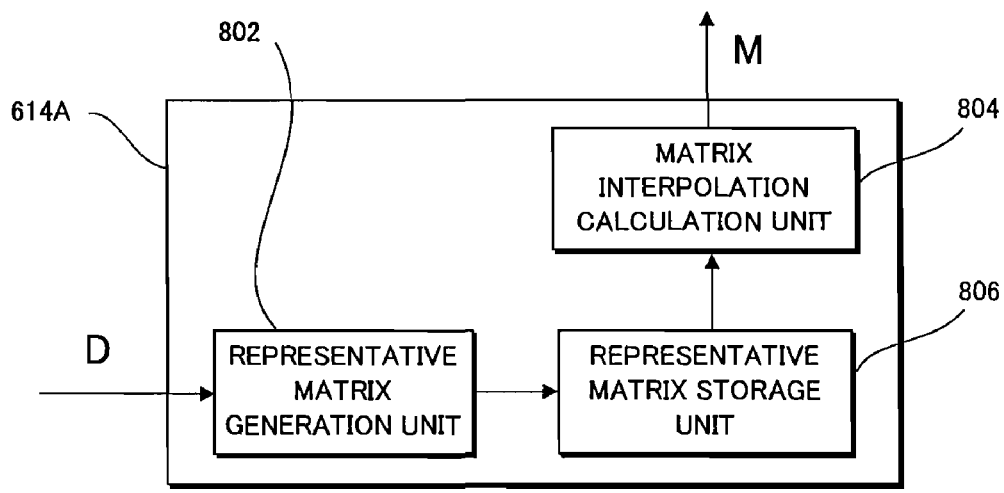
FIG. 8 is a block diagram illustrating an example of the internal constitution of a processing block for generating the color conversion matrix in accordance with the processing method shown in FIG. 7.

FIG. 7 shows four adjacent divided areas $P_{i,j}$, $P_{i+1,j}$, $P_{i,j+1}$, $P_{i+1,j+1}$. The representative matrix generation unit 802 determines color conversion matrices $M_{i,j}$, $M_{i+1,j}$, $M_{i,j+1}$, $M_{i+1,j+1}$ corresponding respectively to the divided areas. These color conversion matrices $M_{i,j}$, $M_{i+1}$, $M_{i,j+1}$, $M_{i+1,j+1}$ are referred to as representative matrices.

When respective center pixel positions of the divided areas $P_{i,j}$, $P_{i+1,j}$, $P_{i,j+1}$, $P_{i+1,j+1}$ are set as $(Cx_i, Cy_j)$, $(Cx_{i+1}, Cy_j)$, $(Cx_i, Cy_{j+1})$, $(Cx_{i+1}, Cy_{j+1})$, a position of a subject pixel for determining a color conversion matrix through matrix interpolation calculation is set as $(x, y)$, and the color conversion matrix in the pixel position $(x, y)$ is set as $M(x, y)$, the color conversion matrix $M(x, y)$ can be determined using the following equation.

$$M(x, y) = n \times m \times M_{i+1, j+1} + n \times (1-m) \times M_{i, j+1} +$$
$$(1-n) \times m \times M_{i+1, j} + (1-n) \times (1-m) \times M_{i, j}$$

Where $$m = \frac{x - Cx_i}{Cx_{i+1} - Cx_i}, n = \frac{y - Cy_j}{Cy_{j+1} - Cy_j}$$

$M_{i,j}$: color conversion matrix for area $P_{i,j}$
$(Cx_i, Cy_j)$: center pixel position of area $P_{i,j}$ As is evident from the above equation, the effect of the representative matrix $M_{i,j}$ of the divided area $P_{i,j}$ intensifies as the pixel position $(x, y)$, for example, approaches the center pixel position $(Cx_i, Cy_j)$ of the divided area $P_{i,j}$, and therefore the effect of the respective representative matrices of the four divided areas $P_{i,j}$, $P_{i+1,j}$, $P_{i,j+1}$, $P_{i+1,j+1}$ is received steadily more equally toward the center of the four divided areas.

According to the constitution described above with reference to FIGS. 7 and 8, the imperfection such as a discontinuous color change at a boundary part of the divided area can be suppressed.

The on-chip color filters are described above as being arranged in a Bayer arrangement, but this invention is not limited thereto. Further, the number of colors of the on-chip color filters may be three, four, or more, and the colors of the color filters are not limited to R, G, B. Similarly, the multipoint spectral measurement sensor 122 may output image signals not only in six colors, but also in a larger number of colors such as 10 or 16, for example.

Second Embodiment

Figure 9:
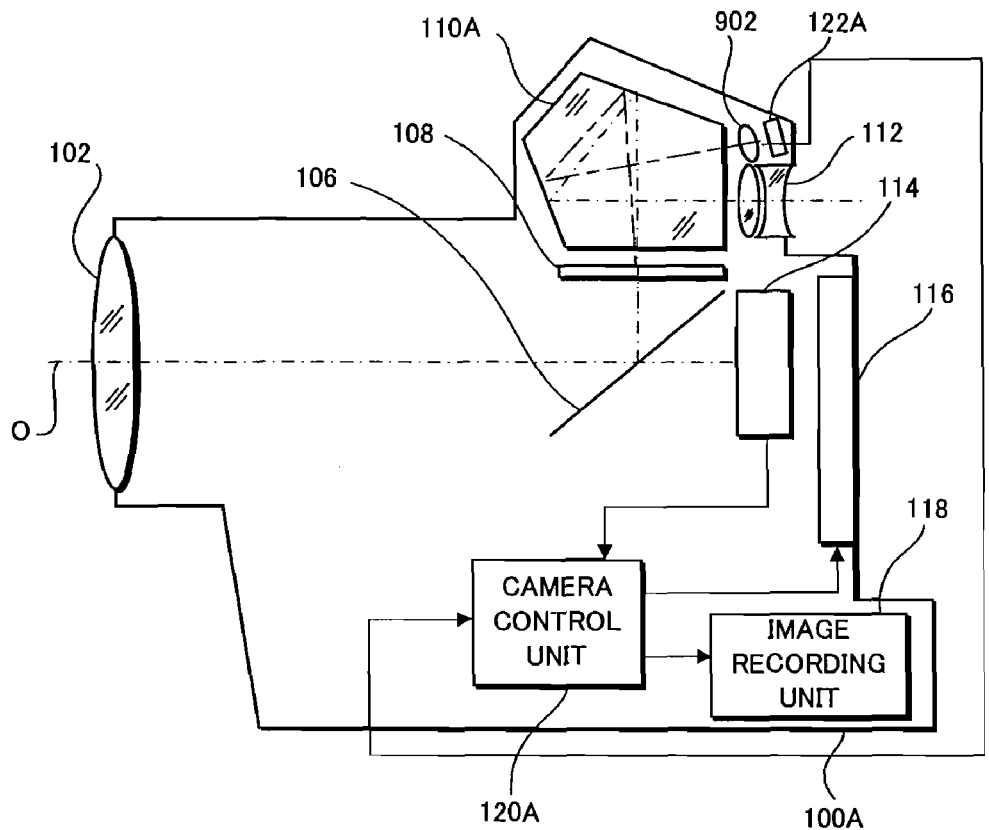
FIG. 9 is a block diagram illustrating an example of the internal constitution of an image capturing apparatus according to a second embodiment.

FIG. 9 is a block diagram showing the schematic constitution of an image capturing apparatus 100A according to a second embodiment of this invention. In FIG. 9, identical constitutional components to those of FIG. 1 have been allocated identical reference numerals, and description thereof has been omitted. The image capturing apparatus 100A to be described below is a single-lens reflex type digital still camera in which the imaging lens 102 may be replaced.

The second embodiment differs mainly from the first embodiment in that the half mirror 104 and OLPF 124 provided in the image capturing apparatus 100 according to the first embodiment shown in FIG. 1 have been omitted, a multipoint spectral measurement sensor 122A is provided above the eyepiece 112, and a re-imaging lens 902 is provided between a pentaprism 110A and the multipoint spectral measurement sensor 122A.

When the photographer performs image pickup preparation, the main mirror 106 is in the down position shown in FIG. 9 such that the object light emanating from the imaging lens 102 is led to the focusing screen 108 by the main mirror 106. The photographer then views the image (primary image) of the object formed on the focusing screen 108 through the pentaprism 110A and the eyepiece 112. At this time, the image of the object formed on the focusing screen 108 is reformed by the re-imaging lens 902 as a secondary image on the light receiving surface of the multipoint spectral measurement sensor 122A.

The advantage of providing the image capturing apparatus 100A according to the second embodiment with the above constitution is that the multipoint spectral measurement sensor can also be used as a photometric sensor for measuring (performing photometry of) the brightness of the object. By using the multipoint spectral measurement sensor at this time, divided photometry, in which photometry is performed while dividing the imaging field of view into a plurality of areas, can be performed. Further, since the half mirror 104 of the first embodiment is not provided, the light quantity of the object light led to the RGB image sensor 114 during image pickup does not attenuate. Moreover, space for providing the half mirror is not required, and therefore the optical design freedom of the imaging lens 102 can be increased and the size of the image capturing apparatus 100A can be reduced.

In the first embodiment, the OLPF 124 is provided to reduce the spatial frequency of the object image formed on the light receiving surface of the multipoint spectral measurement sensor 122 by the imaging lens 102, but in the second embodiment, the spatial frequency of the object image formed on the multipoint spectral measurement sensor 122A can be reduced by the re-imaging lens 902. Alternatively, an OLPF, a diffuser, or similar may be provided between the re-imaging lens 902 and the multipoint spectral measurement sensor 122A, or a surface shape with which a diffusion effect is obtained may be formed to a lens surface of the re-imaging lens 902. Moreover, a focal point position of the re-imaging lens 902 may be offset from the light receiving surface of the multipoint spectral measurement sensor 122A (i.e. defocused).

The RGB image sensor 114 and the multipoint spectral measurement sensor 122 are constituted as described above with reference to FIGS. 3 to 5. Further, the internal constitution of a camera control unit 120A, the color conversion processing performed in the camera control unit 120A, and so on are similar to those described with reference to FIG. 2 and FIGS. 6 to 8. However, the sequence that is executed during an image pickup operation differs on the points illustrated in FIG. 10.

Figure 10:
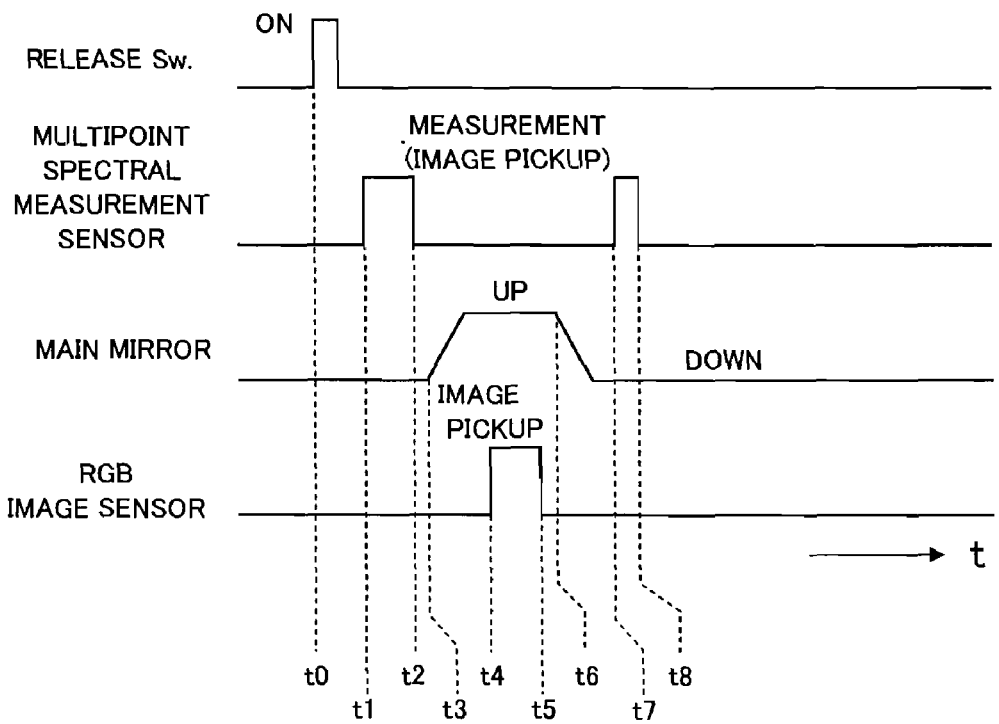
FIG. 10 is a timing chart illustrating an image pickup sequence executed by the image capturing apparatus according to the second embodiment.

FIG. 10 is a timing chart showing an outline of an image pickup operation sequence control procedure executed by the camera control unit 120A, in which time t is shown on the abscissa and operations or states of a release switch, the multipoint spectral measurement sensor 122A, the main mirror 106, and the RGB image sensor 114 are shown on the ordinate.

At a time t0, the release switch is turned ON, whereby the camera control unit 120A begins a series of operation control processes performed during image pickup. Between a time t1 and a time t2, measurement (image pickup) is performed by the multipoint spectral measurement sensor 122A, and at a time t3, the main mirror 106 starts to move upwardly. At this time, although not shown in the figure, an aperture of the imaging lens 102 is reduced. When the upward movement of the main mirror 106 is completed, image pickup is performed by the RGB image sensor 114 between a time t4 and a time t5. At a time t6, the main mirror 106 begins to move downwardly and the aperture of the imaging lens 102 performs an opening operation. When the downward movement of the main mirror 106 is completed, measurement (image pickup) is performed again by the multipoint spectral measurement sensor 122A between a time t7 and a time t8.

In the image pickup sequence described above with reference to FIG. 10, the multipoint spectral measurement sensor 122A performs measurement twice, i.e. once before the main mirror 106 moves up and once after the main mirror 106 has moved down. A temporal deviation occurs between the image pickup timing of the RGB image sensor 114 and the multipoint spectral measurement timing of the multipoint spectral measurement sensor 122A, and therefore, by performing multipoint spectral measurement twice, i.e. before and after the image pickup timing of the RGB image sensor 114, a more accurate multipoint spectral measurement result can be obtained in relation to the object.

Instead of the sequence described above, the measurement result obtained before the main mirror 106 moves up may be used in photometry for measuring the brightness of the object and the multipoint spectral measurement may be performed after the main mirror 106 has moved down. Further, the measurement that is performed by the multipoint spectral measurement sensor 122A after the main mirror 106 has moved down may be omitted such that both photometry and multipoint spectral measurement are performed before the main mirror 106 moves up. Alternatively, multipoint spectral measurement may be performed a plurality of times before the main mirror 106 moves up, after the main mirror 106 has moved down, or both before the up movement and after the down movement, whereupon averaging processing or the like is performed on the obtained multipoint spectral measurement results.

According to the second embodiment of the invention described above, image data exhibiting superior color reproducibility can be obtained without increasing the size of the image capturing apparatus 100A. Moreover, by disposing the multipoint spectral measurement sensor 122A in a location that is used conventionally as a space for disposing a photometry sensor, image data exhibiting superior color reproducibility can be output without greatly altering the constitution of the image capturing apparatus 100A. In addition, the multipoint spectral measurement sensor can be used also as a photometry sensor.

Third Embodiment

In the first embodiment and second embodiment, examples in which the RGB image sensor 114 and the multipoint spectral measurement sensor 122, 122A are provided separately were described. In the third embodiment, on the other hand, the pixels constituting the RGB image sensor and the pixels constituting the multipoint spectral measurement sensor are formed on an identical substrate (die), as will be described in detail below. In this case, the pixels constituting the multipoint spectral measurement sensor are dispersed among the pixels constituting the RGB image sensor.

Figure 11A:
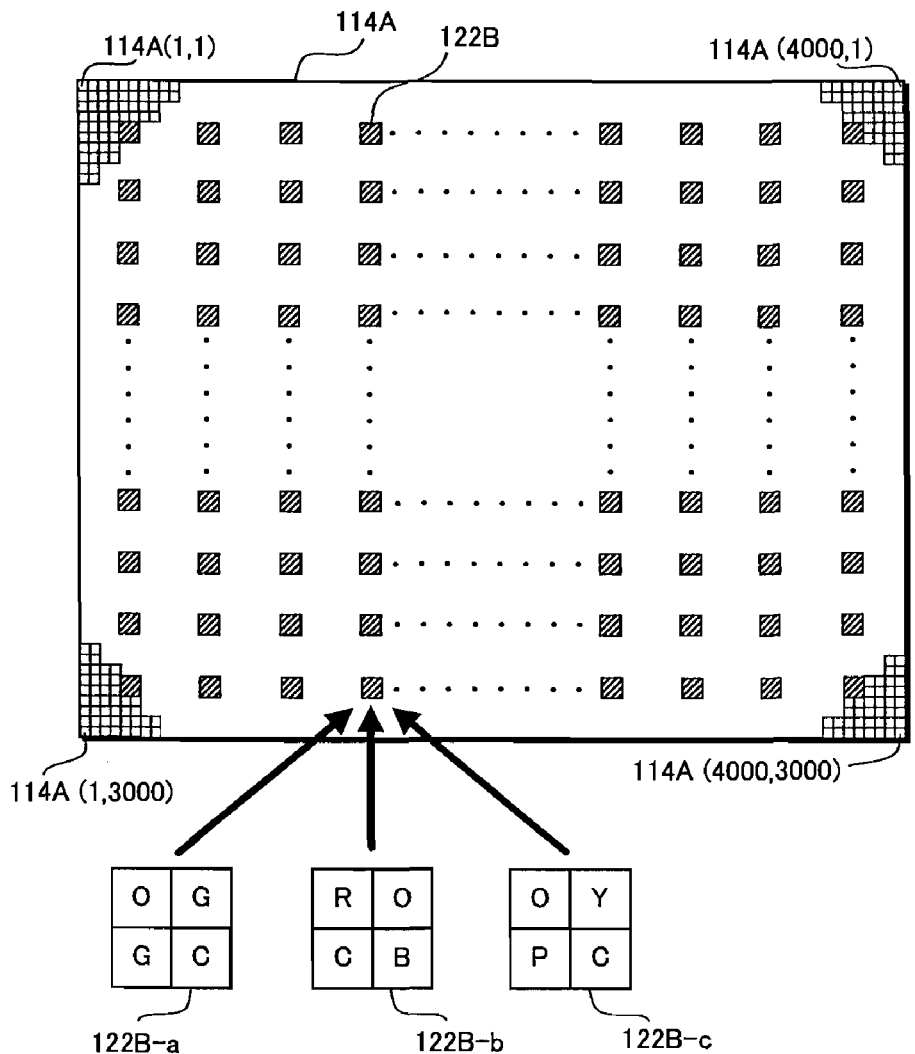
FIG. 11A is a view illustrating an example of an arrangement of on-chip color filters provided on an image sensor used in an image capturing apparatus according to a third embodiment, showing the entire image sensor.
Figure 11B:
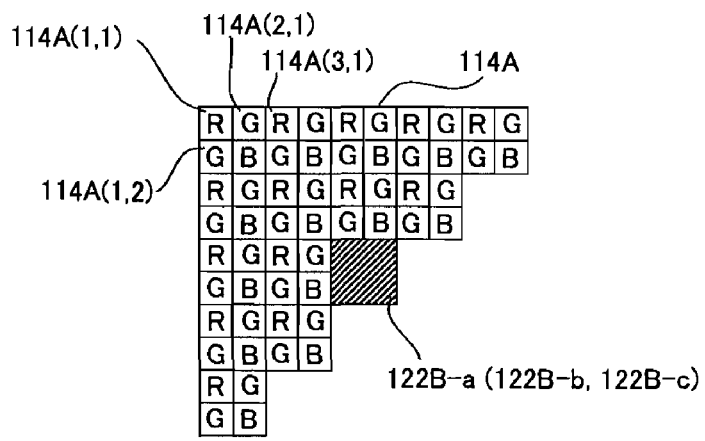
FIG. 11B is a view illustrating an example of the arrangement of the on-chip color filters provided on the image sensor used in the image capturing apparatus according to the third embodiment, showing a partial enlargement of the image sensor.

FIG. 11 is a schematic diagram showing a pixel arrangement of an image sensor 114A, in which FIG. 11A shows the entire light receiving surface of the image sensor 114A and FIG. 11B shows a partial enlargement of the image sensor 114A. The image sensor 114A is assumed to be constituted by 4000 horizontal pixels and 3000 vertical pixels. As shown in FIG. 11B, the image sensor 114A as a whole has on-chip color filters in a Bayer arrangement. In FIGS. 11A and 11B, the manner in which a pixel unit 122B (to be referred to hereafter as "spectral measurement pixel unit 122B") for performing multipoint spectral measurement is arranged is shown by shaded squares. In FIG. 11A, reference symbols 122B-a, 122B-b, 122B-c indicate examples of the spectral measurement pixel unit 122B. One of the pixel units allocated the reference symbols 122B-a, 122B-b, 122B-c is used in the image sensor 114A.

The spectral measurement pixel unit 122B includes four pixels, for example, i.e. two pixels in the vertical direction of FIG. 11 and two pixels in the horizontal direction. Units including these four pixels are dispersed among an array of pixels having on-chip color filters in the Bayer arrangement. FIG. 11A shows an example in which a plurality of the spectral measurement pixel units 122B having on-chip color filters including those with a different spectral transmittance characteristic to R, G, B are arranged discretely at substantially equal intervals among an array of pixels having on-chip color filters in the Bayer arrangement.

For example, a total of 1200 spectral measurement pixel units 122B, comprising forty spectral measurement pixel units 122B in the horizontal direction of FIG. 11 and thirty in the vertical direction, may be arranged. In other words, a single spectral measurement pixel unit 122B may be provided on the image sensor 114A in relation to a single partial area constituted by 10,000 pixels, i.e. 100 pixels in the horizontal direction of FIG. 11 and 100 pixels in the vertical direction. It should be noted that the numbers cited here are merely examples, and the arrangement number and arrangement pitch of the spectral measurement pixel units 122B may be set as desired. Further, the arrangement pitch of the spectral measurement pixel units 122B may be equal or unequal.

Hereafter, the pixels constituting the spectral measurement pixel unit 122B will be referred to as spectral measurement pixels, and the remaining pixels provided with R, G, B on-chip color filters will be referred to as image pickup pixels.

Figures 12A, 12B, 12C, 12D, 12E:
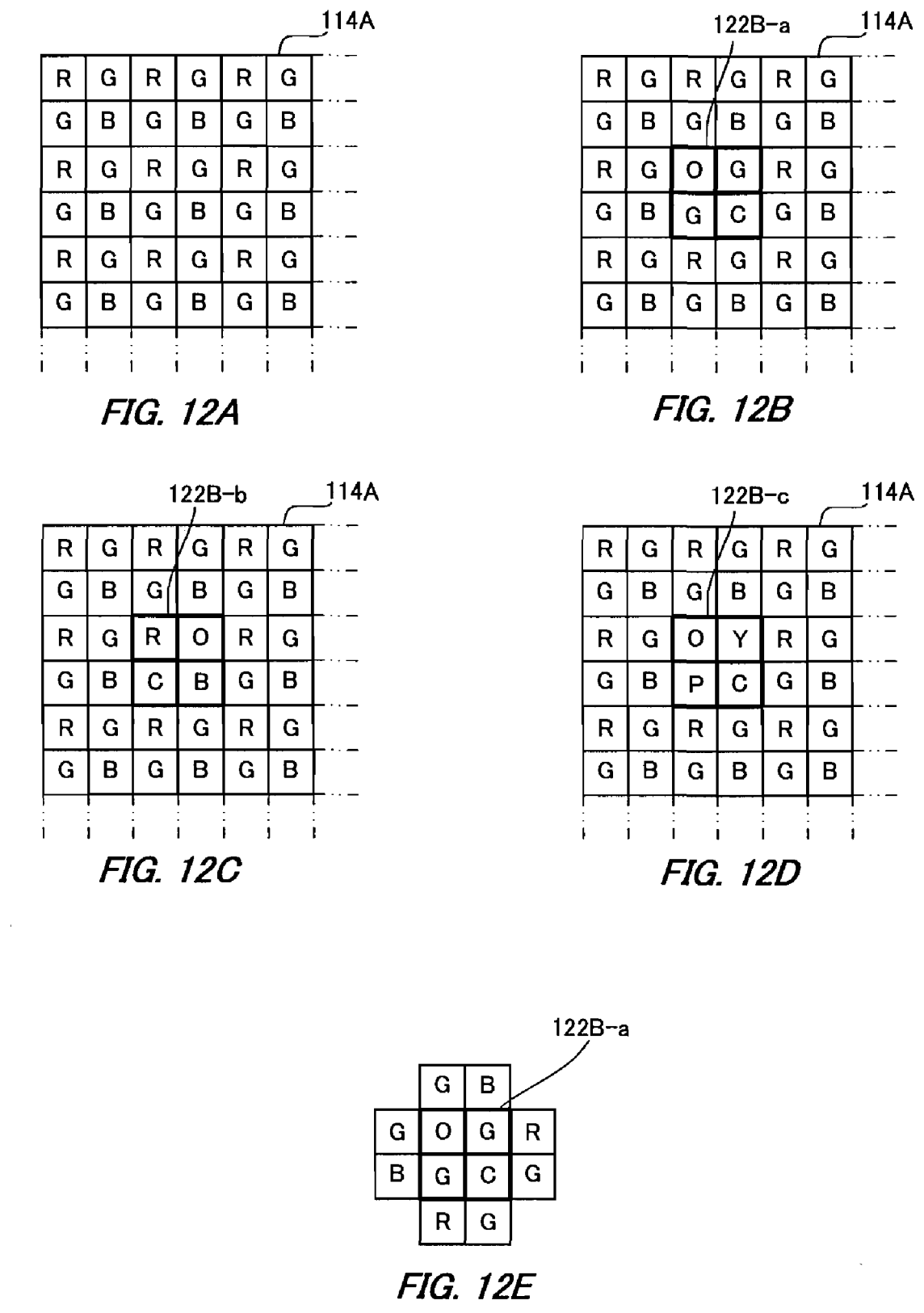

FIG. 11A shows three examples (122B-a, 122B-b, 122B-c) of the spectral measurement pixel unit 122B. FIG. 12 shows an outline of examples in which the spectral measurement pixels are disposed among the image pickup pixels. FIG. 12A shows the image pickup pixels of a part in which no spectral measurement pixels are disposed. As shown in FIG. 12A, G on-chip color filters are arranged in a diagonal direction from the upper right side to the lower left side of FIG. 12, and R, B on-chip color filters are disposed in a checkerboard pattern. FIG. 12B shows the image pickup pixels of a part in which the spectral measurement pixel unit 122B-a is disposed and the vicinity thereof. FIG. 12C shows the image pickup pixels of a part in which the spectral measurement pixel unit 122B-b is disposed and the vicinity thereof. FIG. 12D shows the image pickup pixels of a part in which the spectral measurement pixel unit 122B-c is disposed within the image pickup pixels and the vicinity thereof.

Referring to FIGS. 11A and 12B, the spectral measurement pixel unit 122B-a is formed with orange (O) and cyan (C) on-chip color filters in parts where R and B on-chip color filters are formed on the image pickup pixels. Therefore, when the pixel part in which the spectral measurement pixel unit 122B-a is disposed is used as an image pickup pixel, G color information can be used as is, but R, B color information cannot be obtained from the pixels formed with the O, C on-chip color filters. When a conventional pixel defect interpolation technique is used in this case, image information corresponding to the position in which the spectral measurement pixel unit 122B-a is provided can be obtained. In the example where the spectral measurement pixel unit 122B-a is used, as is evident from FIG. 12B, the pixels formed with the O, C on-chip color filters are surrounded by pixels formed with G on-chip color filters. From the pixels formed with the O, C on-chip color filters and information relating to the pixels surrounding these pixels, highly precise pixel interpolation can be performed.

Referring to FIGS. 11A and 12C, the spectral measurement pixel unit 122B-b is formed with O, C on-chip color filters in parts where G on-chip color filters are formed on the image pickup pixels. Therefore, when the pixel part in which the spectral measurement pixel unit 122B-b is disposed is used as an image pickup pixel, R, B color information can be used as is, but G color information cannot be obtained from the pixels formed with the O, C on-chip color filters. By employing the pixel defect interpolation technique described above in this case, image information corresponding to the position in which the spectral measurement pixel unit 122B-b is disposed can be obtained. In the example using the spectral measurement pixel unit 122B-b, the R, B color information is not defective, and therefore a chromatic resolving power is maintained in the parts where the spectral measurement pixels exist.

Referring to FIGS. 11A and 12D, the spectral measurement pixel unit 122B-c is formed with orange (O), yellow (Y), purple (P), and cyan (C) on-chip color filters in parts where the G, G, B, R on-chip color filters are formed on the image pickup pixels. Therefore, when the pixel part in which the spectral measurement pixel unit 122B-c is disposed is used as an image pickup pixel, the R, G, B color information cannot be obtained. By employing the pixel defect interpolation technique described above in this case, image information corresponding to the position in which the spectral measurement pixel unit 122B-c is disposed can be obtained. In the example using the spectral measurement pixel unit 122B-c, on-chip color filters having a larger number of spectral transmission characteristics are provided. Accordingly, more accurate spectral information can be obtained.

FIG. 12E depicts four spectral measurement pixels formed with O, G, G, C on-chip color filters and constituting the spectral measurement pixel unit 122B-a, and eight image pickup pixels existing on the periphery thereof. To obtain a multipoint spectral measurement result, information obtained from the spectral measurement pixels and information obtained by the image pickup pixels existing on the periphery thereof, which are formed with R, B on-chip color filters, is used. Thus, spectral information having five bands, i.e. R, G, B, O, C, can be obtained. Similarly, when the spectral measurement pixel unit 122B-b is used, spectral information constituted by the above five bands can be obtained. Further, when the spectral measurement pixel unit 122B-c is used, spectral information constituted by a total of seven bands can be obtained using information from the spectral measurement pixels formed with the O, Y, C, P on-chip color filters and information from the image pickup pixels existing on the periphery of these spectral measurement pixels, which are formed with R, G, B on-chip color filters. It is assumed in the following description that the spectral measurement pixel units 122B-a are incorporated into the image sensor 114A.

Figure 13:
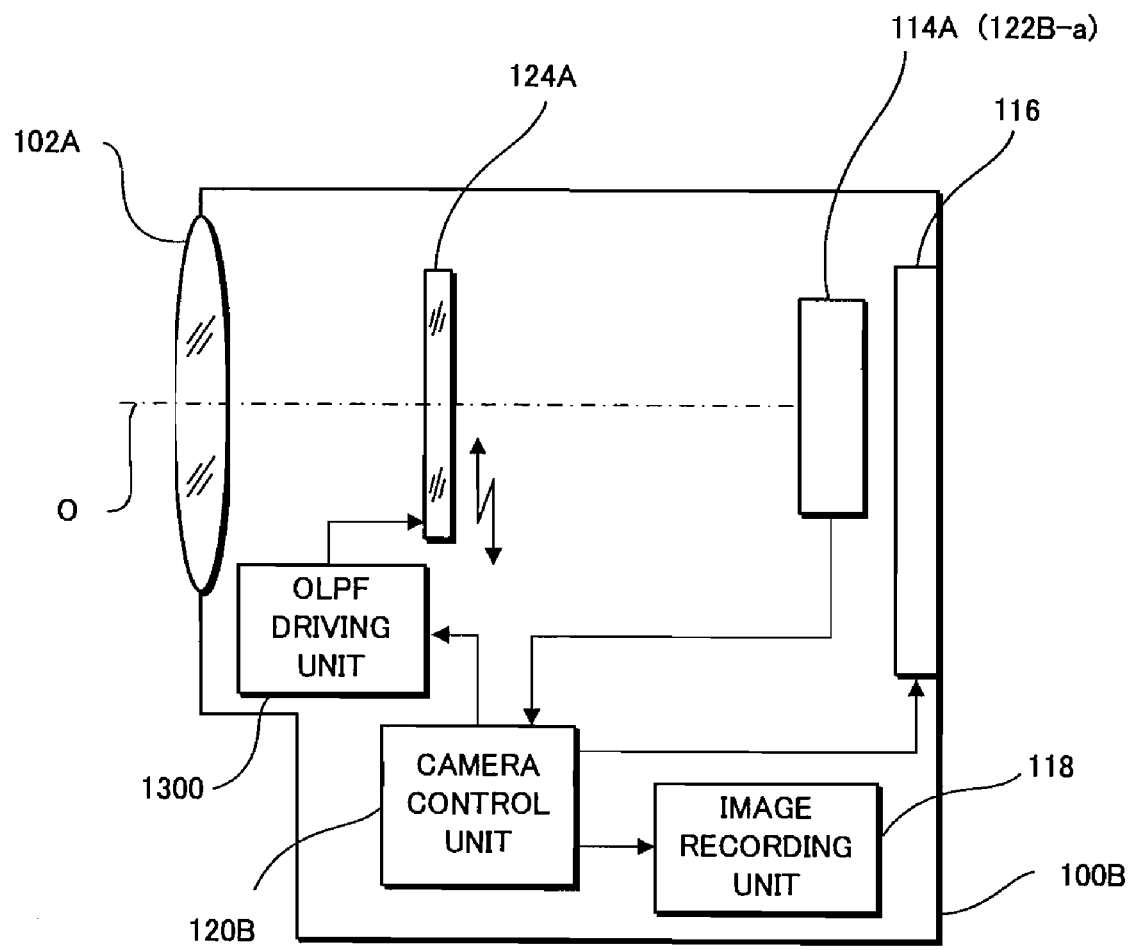
FIG. 13 is a block diagram illustrating an example of the internal constitution of the image capturing apparatus according to the third embodiment.

FIG. 13 is a block diagram showing the schematic constitution of an image capturing apparatus 100B incorporated with the image sensor 114A described with reference to FIGS. 11 and 12. The image capturing apparatus 100B to be described below is a so-called compact camera. The image capturing apparatus 100B comprises an imaging lens 102A, an OLPF 124A, the image sensor 114A, the display unit 116, an OLPF driving unit 1300, a camera control unit 120B, and the image recording unit 118. Of these constitutional elements, the display unit 116 and image recording unit 118 are identical to their counterparts of the first embodiment, described with reference to FIG. 1, and therefore description thereof has been omitted. The imaging lens 102A forms an object image on the light receiving surface of the image sensor 114A, and may be attached to the image capturing apparatus 100B detachably or incorporated therein fixedly.

The OLPF 124A is driven by the OLPF driving unit 1300, and can be inserted into a position intersecting the optical path of the object light that is emanated from the imaging lens 102A so as to enter the light receiving surface of the image sensor 114A. The OLPF 124A is used to reduce the spatial frequency of the object image formed on the light receiving surface of the image sensor 114A by the imaging lens 102A. The light receiving surface of the image sensor 114A is preferably set with an optical characteristic for ensuring that the object light that enters a divided area occupied by a single spectral measurement pixel unit 122B intermingles evenly so that accurate spectral measurement results can be obtained in the divided areas occupied respectively by the plurality of spectral measurement pixel units 122B provided on the image sensor 114A.

The OLPF driving unit 1300 includes an actuator such as a motor or a plunger, and is capable of driving the OLPF 124A between a position intersecting the optical path of the object light emanated from the imaging lens 102A and a position removed from the optical path. It should be noted that the OLPF 124A described above may be omitted, and instead, the focal point position of the imaging lens 102A may be offset in an optical axis direction of the imaging lens 102A (i.e. defocused) during multipoint spectral measurement by the image sensor 114A such that the object light incident on the divided area occupied by a single spectral measurement pixel unit 122B intermingles substantially evenly.

The camera control unit 120B is used to perform overall control of operations such as the image pickup operation of the image capturing apparatus 100B, post-image pickup image processing and recording, and reproduction of a recorded image, and is constituted by a CPU, an ASIC (application specific integrated circuit), a RAM, a ROM, and so on, similarly to the first embodiment.

During an image pickup operation, the camera control unit 120B generates image data constituted by three color RGB color planes by performing demosaicing processing and the interpolation processing described above on an image signal output by the image sensor 114A. At this time, the camera control unit 120B controls the OLPF driving unit 1300 such that when the object image is captured by the image sensor 114A, the OLPF 124A is positioned in the position removed from the optical path of the object light.

Further, the camera control unit 120B controls the OLPF driving unit 1300 such that when multipoint spectral measurement is performed by the image sensor 114A, the OLPF 124A is positioned in the position intersecting the optical path of the object light.

In other words, every time the image capturing apparatus 100B performs a single image pickup operation, the image sensor 114A performs two operations. One operation is an image pickup operation performed when the OLPF 124A is positioned in the position removed from the optical path of the object light, and the other operation is a multipoint spectral measurement operation performed before or after the image pickup operation when the OLPF 124A is positioned in the position intersecting the optical path of the object light.

It should be noted that the image sensor 114A may perform three or more operations every time the image capturing apparatus 100B performs a single image pickup operation. In this case, one operation is the image pickup operation performed when the OLPF 124A is positioned in the position removed from the optical path of the object light, and the remaining operations are multipoint spectral measurement operations performed before, after, or both before and after the image pickup operation when the OLPF 124A is positioned in the position intersecting the optical path of the object light. At this time, a plurality of multipoint spectral measurement operations may be performed at timings before and after the image pickup operation, whereupon averaging processing is performed on the basis of the plurality of obtained multipoint spectral measurement results.

Figure 14:
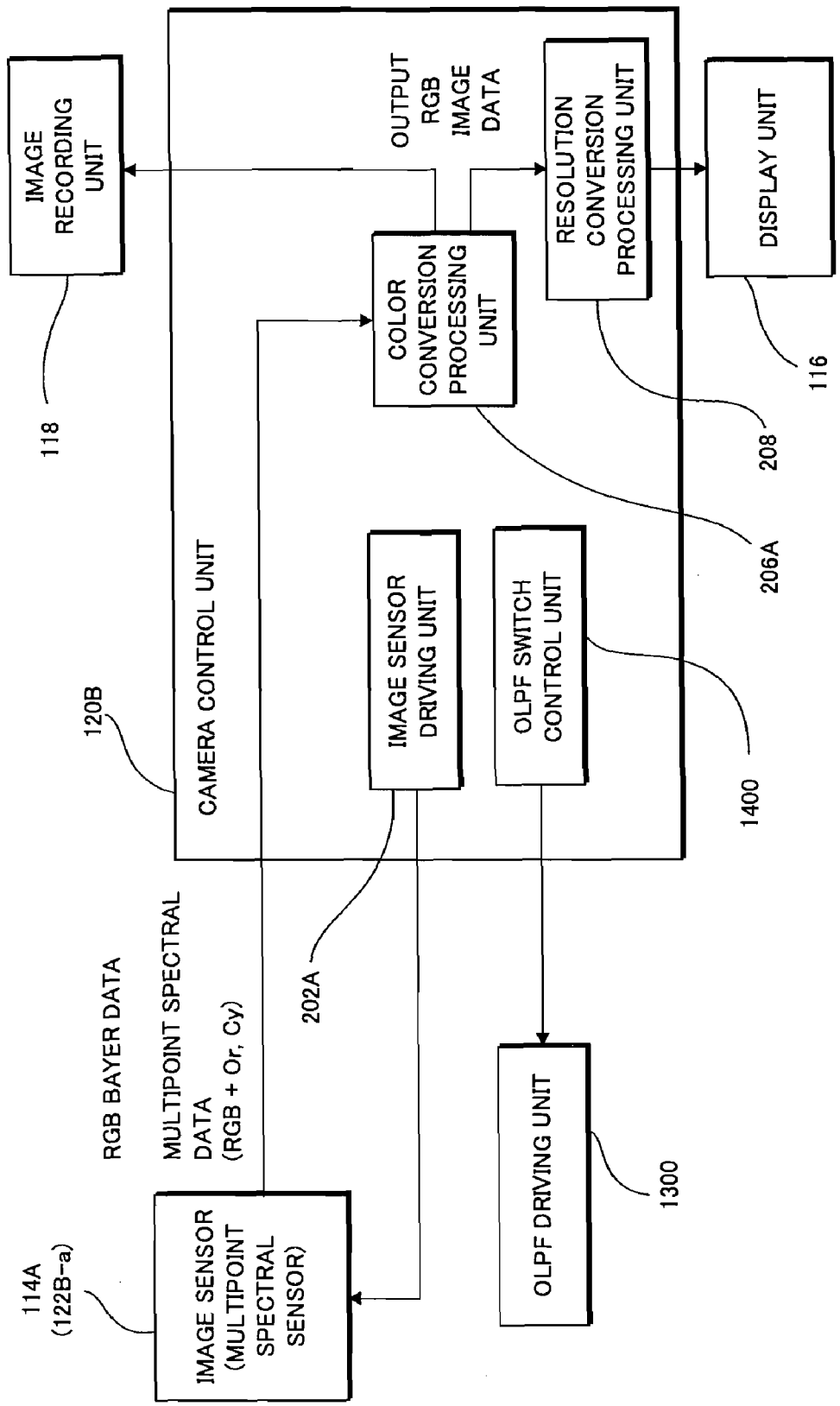
FIG. 14 is a block diagram illustrating an example of the internal constitution of a camera control unit.

FIG. 14 is a block diagram illustrating the internal constitution of the camera control unit 120B. The camera control unit 120B comprises an image sensor driving unit 202A, an OLPF switch control unit 1400, a color conversion processing unit 206A, and the resolution conversion processing unit 208.

The OLPF switch control unit 1400 performs control to switch the position of the OLPF 124A as described above by outputting a control signal to the OLPF driving unit 1300 during the image pickup and multipoint spectral measurement operations of the image sensor 114A.

The image sensor driving unit 202A controls respective operation start timings of the image pickup operation and the multipoint spectral measurement operation performed by the image sensor 114A, and then controls the image sensor 114A such that the image data and multipoint spectral measurement data obtained as a result of the image pickup and multipoint spectral measurement operations are output to the camera control unit 120B from the image sensor 114A.

The color conversion processing unit 206A stores the five color RGBOC multipoint spectral measurement data output from the image sensor 114A following the multipoint spectral measurement performed by the image sensor 114A.

The color conversion processing unit 206A performs demosaicing processing and pixel interpolation processing on the RGB Bayer data output by the image sensor 114A following the image pickup operation performed by the image sensor 114A, thereby generating 12-million pixel RGB image data constituted by three color RGB color planes.

The color conversion processing unit 206A also performs color conversion processing to be described below on the RGB image data described above, and outputs the resulting output RGB data to the image recording unit 118 and the resolution conversion processing unit 208. The resolution conversion processing unit 208 converts the resolution of the output RGB image data to a resolution suited to the display resolution of the display unit 116.

Figure 15:
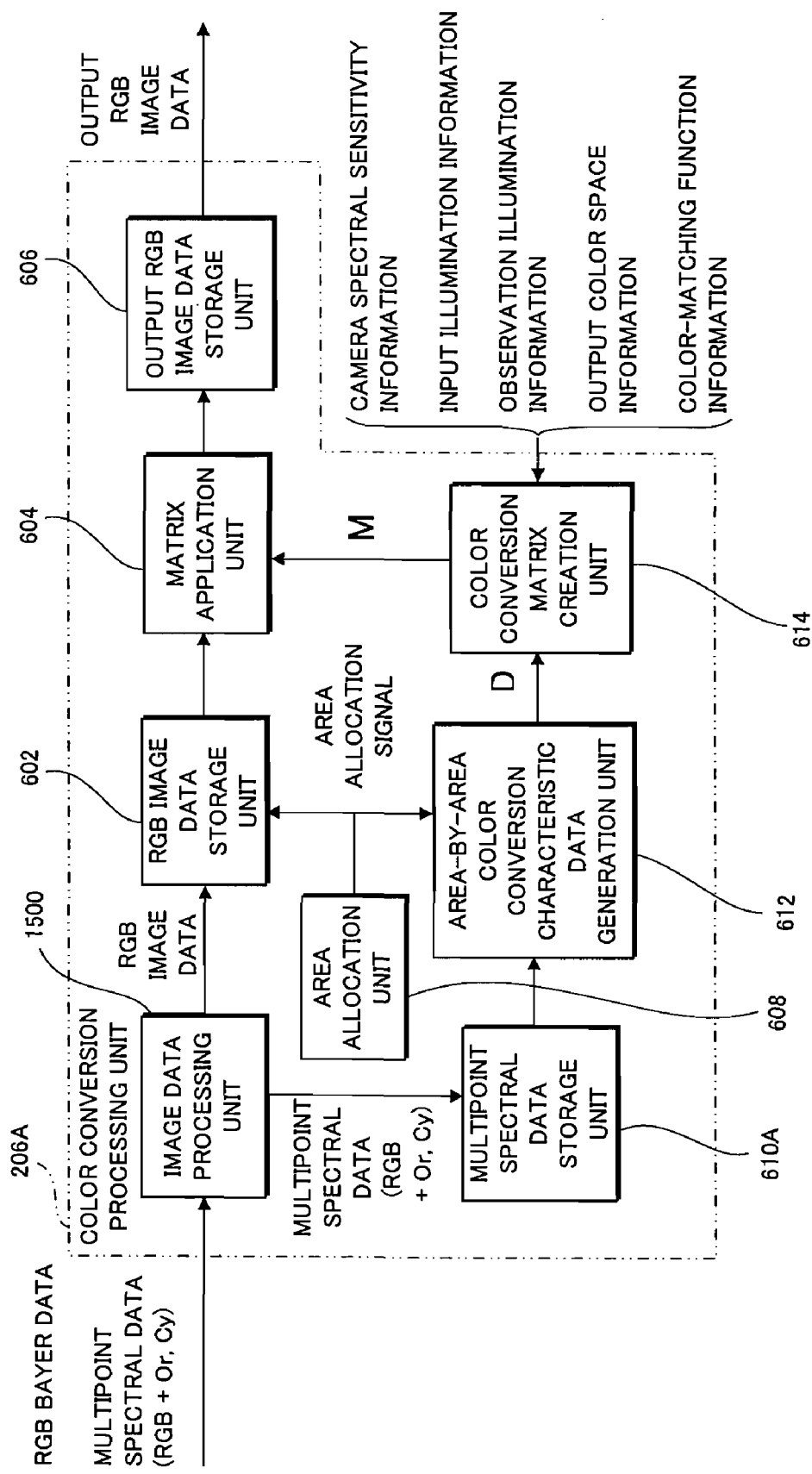
FIG. 15 is a block diagram illustrating an example of the internal constitution of a color conversion processing unit.

FIG. 15 is a schematic block diagram showing an example of the internal constitution of the color conversion processing unit 206A. In FIG. 15, identical constitutional elements to the constitutional elements of the color conversion processing unit 206 described in the first embodiment with reference to FIG. 6 have been allocated identical reference numerals to those shown in FIG. 6, and description thereof has been omitted.

The color conversion processing unit 206A differs from the color conversion processing unit 206 shown in FIG. 6 in that an image data processing unit 1500 is provided therein and a multipoint spectral data storage unit 610A stores multipoint spectral data output by the image data processing unit 1500. The following description of the color conversion processing unit 206A centers on these differences.

The image data processing unit 1500 performs demosaicing processing and pixel interpolation processing on input image data (RGB Bayer data) that are output from the image sensor 114A following the image pickup operation. The image data processing unit 1500 thus generates 12-million pixel RGB image data constituted by three color RGB color planes, which are output to the RGB image data storage unit 602. Further, the image data processing unit 1500 inputs five color RGBOC multipoint spectral data output by the image sensor 114A following the multipoint spectral measurement operation, and outputs these multipoint spectral data to the multipoint spectral data storage unit 610A.

The color conversion matrix M is then generated on the basis of the multipoint spectral data stored in the multipoint spectral data storage unit 610A, as described in the first embodiment with reference to FIG. 6. The color conversion matrix is then applied to the RGB image data stored in the RGB image data storage unit to generate the output RGB image data. The output RGB image data of a single frame are stored temporarily in the output RGB image data storage unit 606. The output RGB image data are then output from the output RGB image data storage unit 606 to the image recording unit 118 and the resolution conversion processing unit 208 (FIG. 14).

According to the image capturing apparatus 100B of the third embodiment, the image pickup pixels and spectral measurement pixels are provided on the same substrate, and therefore the need for an optical path splitting optical member such as a half mirror or a beam splitter is eliminated, enabling a reduction in the size of the image capturing apparatus 100B. Moreover, reductions in the light quantity of the object light entering the image sensor 114A caused by a half mirror or a beam splitter can be suppressed, and therefore the effective sensitivity of the image sensor 114A can be improved.

In the first to third embodiments described above, the RGB image sensor 114 (image sensor 114A) includes on-chip color filters in three colors, i.e. R, G, B, and the multipoint spectral measurement sensor 122, 122A and spectral measurement pixel unit 122B include on-chip color filters in six colors, i.e. B, C, G, Y, O, R or five colors, i.e. R, G, B, O, C. However, this invention is not limited to these examples, and instead, the image pickup image sensor may have on-chip color filters in more than three colors, for example five colors, and the spectral measurement sensor or spectral measurement pixel unit may have on-chip color filters in 16 colors or the like.

Embodiments of this invention were described above, but the above embodiments merely illustrate examples of application of this invention, and the technical scope of the invention is not limited to the specific constitutions of these embodiments.

This application claims priority based on Patent application No. 2008-103752, filed with the Japan Patent Office on Apr. 11, 2008, the entire contents of which are incorporated into this specification by reference.

What is claimed is:

1. An image capturing apparatus comprising:
a first image sensor unit capable of subjecting an object image formed by an imaging lens to a photoelectric conversion to output a first image signal having a first resolution and constituted by a first number of colors;
a second image sensor unit capable of subjecting the object image formed by the imaging lens to a photoelectric conversion to output a second image signal having a second resolution that is lower than the first resolution and constituted by a second number of colors that is larger than the first number of colors, the second image sensor unit is configured to be capable of individually measuring respective object spectral characteristics of a plurality of divided areas, the divided areas obtained by dividing an imaging field of view of the first image sensor unit two-dimensionally;
a spatial frequency reduction unit for reducing a spatial frequency of the object image formed on a light receiving surface of the second image sensor unit by the imaging lens; and
a color conversion processing unit for performing color conversion processing on image data generated by processing the first image signal output by the first image sensor unit on the basis of the second image signal output by the second image sensor unit.

2. The image capturing apparatus as defined in claim 1, further comprising an optical path splitting unit configured such that an object light emanating from the imaging lens is led alternately or simultaneously to both the first image sensor unit and the second image sensor unit,
wherein the spatial frequency reduction unit is disposed on an optical path of the object light between the optical path splitting unit and the second image sensor unit.

3. The image capturing apparatus as defined in claim 1, wherein the first image sensor unit and the second image sensor unit are formed on an identical substrate such that pixels constituting the second image sensor unit are dispersed among pixels constituting the first image sensor unit,
the spatial frequency reduction unit includes an optical member that can be inserted into and removed from a position intersecting an optical path of an object light emanating from the imaging lens and incident into the first image sensor unit and the second image sensor unit, and
the optical member is positioned in a position removed from the optical path of the object light when the first image sensor unit and the second image sensor unit perform the photoelectric conversion for outputting the first image signal, and is positioned in the position intersecting the optical path of the object light incident into the first image sensor unit and the second image sensor unit when the first image sensor unit and the second image sensor unit perform the photoelectric conversion for outputting the second image signal.

4. The image capturing apparatus as defined in claim 3, further comprising an image data processing unit for generating image data by subjecting pixel information relating to positions of the first image sensor unit in which the pixels constituting the second image sensor unit exist to interpolation processing on the basis of pixel information obtained from pixels existing on a periphery of the pixels constituting the second image sensor unit.

5. The image capturing apparatus as defined in claim 1, wherein the first image sensor unit and the second image sensor unit are formed on a substantially identical plane such that pixels constituting the second image sensor unit are dispersed among pixels constituting the first image sensor unit, and
when the photoelectric conversion for outputting the second image signal is performed by the first image sensor unit and the second image sensor unit, the spatial frequency reduction unit defocuses an image forming position of an object light that is emanated from the imaging lens and incident into the first image sensor unit and the second image sensor unit from a light receiving surface of the first image sensor unit and the second image sensor unit.

6. The image capturing apparatus as defined in claim 5, further comprising an image data processing unit for generating image data by subjecting pixel information relating to positions of the first image sensor unit in which the pixels constituting the second image sensor unit exist to interpolation processing on the basis of pixel information obtained from pixels existing on a periphery of the pixels constituting the second image sensor unit.

7. An image capturing apparatus comprising:
a first image sensor unit capable of subjecting an object image formed by an imaging lens to a photoelectric conversion to output a first image signal having a first resolution and constituted by a first number of colors;
a second image sensor unit capable of subjecting the object image formed by the imaging lens to a photoelectric conversion to output a second image signal having a second resolution that is lower than the first resolution and constituted by a second number of colors that is larger than the first number of colors;
a reflection mirror capable of moving between an observation position and an image pickup position, whereby in the observation position, an object light emanating from the imaging lens is led onto a focusing screen disposed in a conjugated position with a light receiving surface of the first image sensor unit to make the object image observable, and in the image pickup position, the reflection mirror retreats from an optical path of the object light such that the object image formed by the imaging lens is led to the first image sensor unit;
a re-imaging optical system for reforming a primary image of the object formed on the focusing screen when the reflection mirror is in the observation position such that a secondary image is formed on a light receiving surface of the second image sensor unit; and a spatial frequency reduction unit for reducing a spatial frequency of the secondary image formed on the light receiving surface of the second image sensor unit by the re-imaging optical system.

8. The image capturing apparatus as defined in claim 7, wherein the second image sensor unit is configured to be capable of individually measuring respective object spectral characteristics of a plurality of divided areas, the divided areas being obtained by dividing an imaging field of view of the first image sensor unit two-dimensionally, and the image capturing apparatus further comprises a color conversion processing unit for performing color conversion processing on image data generated by processing the first image signal output by the first image sensor unit on the basis of the second image signal output by the second image sensor unit.

* * * * *